(12) United States Patent
Moriwaki et al.

(10) Patent No.: US 9,927,132 B2
(45) Date of Patent: Mar. 27, 2018

(54) AIR CONDITIONING SYSTEM

(71) Applicant: DAIKIN INDUSTRIES, LTD., Osaka-shi, Osaka (JP)

(72) Inventors: Michio Moriwaki, Sakai (JP); Hiroshi Yoh, Sakai (JP); Masakazu Okamoto, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 450 days.

(21) Appl. No.: 14/612,021

(22) Filed: Feb. 2, 2015

(65) Prior Publication Data
US 2015/0219343 A1    Aug. 6, 2015

(30) Foreign Application Priority Data
Feb. 3, 2014    (JP) .................. 2014-018812

(51) Int. Cl.
F24D 19/10 (2006.01)
F24D 5/12 (2006.01)
F24D 11/02 (2006.01)

(52) U.S. Cl.
CPC ........... F24D 19/1087 (2013.01); F24D 5/12 (2013.01); F24D 11/02 (2013.01); *F24D 2200/04* (2013.01); *F24D 2200/123* (2013.01); *F24D 2200/32* (2013.01); *F24D 2220/042* (2013.01); *Y02B 30/14* (2013.01); *Y02B 30/50* (2013.01)

(58) Field of Classification Search
CPC .... F24D 19/1087; F24D 19/1093; F24D 5/12; F24D 11/0271; F24D 2200/32; F24D 2200/04; F24D 2200/123; F24D 2220/042; F24D 12/02; F24D 15/04; F24D 19/10; F24D 11/02; Y02N 30/14; Y02N 30/50

USPC .................... 237/2 A, 2 B, 81; 236/10, 91 D
See application file for complete search history.

(56) References Cited

U.S. PATENT DOCUMENTS

| | | | | |
|---|---|---|---|---|
| 3,173,476 A | * | 3/1965 | McCready | F25B 13/00 165/232 |
| 4,143,707 A | * | 3/1979 | Lewis | F24D 11/0271 165/242 |
| 4,217,761 A | * | 8/1980 | Cornaire | G01K 17/08 165/11.1 |

(Continued)

FOREIGN PATENT DOCUMENTS

| | | | | |
|---|---|---|---|---|
| EP | 0098787 B1 | * | 1/1987 | ......... F24D 19/1087 |
| JP | 64-54160 A | | 3/1989 | |
| JP | 2015068607 A | * | 4/2015 | ......... F24D 19/1087 |

*Primary Examiner* — Gregory Huson
*Assistant Examiner* — Daniel E Namay

(57) ABSTRACT

An air conditioning system includes a heat pump unit including a radiator usable with a refrigerant, a gas furnace unit including a heating section arranged to heat passing air, a blower arranged to generate an air flow that passes through the radiator and the heating section, and a controller configured to control each action of the heat pump unit, the gas furnace unit, and the blower. The controller operates either the heat pump unit or the gas furnace unit as a heat source unit, generates a capacity command used to variably adjust operating capacity of the heat source unit, and executes switch control in order to switch the heat source unit from either one of the heat pump unit or the gas furnace unit to the other when an operating capacity level designated in the capacity command is within a predetermined numerical range for a predetermined time.

15 Claims, 10 Drawing Sheets

(56) References Cited

U.S. PATENT DOCUMENTS

| | | | | |
|---|---|---|---|---|
| 4,445,567 A * | 5/1984 | Nelson | | F24D 5/12 165/240 |
| 4,474,227 A * | 10/1984 | Reedy | | F24D 19/1087 165/11.1 |
| 4,476,920 A * | 10/1984 | Drucker | | F24D 19/1087 165/242 |
| 4,716,957 A * | 1/1988 | Thompson | | F24F 3/001 165/11.1 |
| 4,971,136 A * | 11/1990 | Mathur | | F24D 19/1039 165/11.1 |
| 6,176,306 B1 * | 1/2001 | Gault | | F24D 19/1087 165/240 |
| 6,729,390 B1 * | 5/2004 | Toth | | F24D 12/02 165/240 |
| 7,212,887 B2 * | 5/2007 | Shah | | G05B 15/02 236/91 D |
| 7,380,588 B2 * | 6/2008 | Helt | | F24D 12/02 165/240 |
| 8,282,017 B2 * | 10/2012 | Hawkins | | F24D 5/12 122/215 |
| 8,702,013 B2 * | 4/2014 | Zhadanovsky | | F01K 17/02 237/16 |
| 9,027,846 B2 * | 5/2015 | Zhadanovsky | | F01K 17/02 237/16 |
| 9,175,864 B2 * | 11/2015 | Yun | | F24D 3/02 |
| 9,279,590 B2 * | 3/2016 | Bohan | | F24D 3/00 |
| 9,477,242 B2 * | 10/2016 | Kovalcik | | G05D 23/1919 |
| 9,557,067 B2 * | 1/2017 | Kojima | | F24D 5/02 |
| 2004/0118933 A1 * | 6/2004 | Readio | | F24D 12/02 237/2 B |
| 2005/0150650 A1 * | 7/2005 | Helt | | F24D 12/02 165/240 |
| 2008/0023564 A1 * | 1/2008 | Hall | | F24D 12/02 237/12 |
| 2008/0054082 A1 * | 3/2008 | Evans | | F24D 12/02 236/91 D |
| 2010/0090017 A1 * | 4/2010 | Naghshineh | | F24H 9/2085 237/2 B |
| 2012/0248212 A1 * | 10/2012 | Storm | | F24D 12/02 237/12 |
| 2013/0066472 A1 * | 3/2013 | Harrod | | F24F 11/0086 700/276 |
| 2013/0204439 A1 * | 8/2013 | Scelzi | | G06Q 10/00 700/276 |
| 2013/0248609 A1 * | 9/2013 | Aspeslagh | | F24D 3/08 237/8 A |

* cited by examiner

AIR CONDITIONING SYSTEM

CROSS-REFERENCE TO RELATED APPLICATIONS

This application claims priority under 35 U.S.C. § 119 to Japanese Patent Application No. 2014-018812, filed Feb. 3, 2014. The entire disclosure of Japanese Patent Application No. 2014-018812 is hereby incorporated herein by reference.

FIELD OF THE INVENTION

The present invention relates to an air conditioning system provided with a gas furnace unit and a heat pump unit.

BACKGROUND

In the past there have been air conditioning systems provided with a gas furnace unit and a heat pump unit, that perform air conditioning in a space to be air-conditioned. For example, Japanese Laid-open Patent Publication No. 64-54160 discloses an air conditioning system provided with a gas furnace unit and a heat pump unit, that switches between operating the gas furnace unit or the heat pump unit as a heat source unit at the moment a predetermined condition is fulfilled.

SUMMARY

Technical Problem

However, in the air conditioning system disclosed in Patent Literature 1, in the control logic by which the heat source unit is switched, no particular consideration is given to cases in which the operating capacities of the gas furnace unit and heat pump unit can be variably adjusted, and it is assumed that environmental loads such as the amount of $CO_2$ emission increase depending on the circumstances.

In view of this, the problem of the present invention is to provide an air conditioning system that restrains environmental loads.

Solution to Problem

An air conditioning system according to a first aspect of the present invention comprises a heat pump unit, a gas furnace unit, a blower, and a controller. The heat pump unit includes a radiator for a refrigerant. The gas furnace unit includes a heating section. The heating section heats passing air. The blower generates an air flow that passes through the radiator and the heating section. The controller controls each action of the heat pump unit, the gas furnace unit, and the blower. The controller operates either the heat pump unit or the gas furnace unit as a heat source unit. The controller generates a capacity command for variably adjusting the operating capacity of the heat source unit. The controller executes switch control when the operating capacity level designated in the capacity command continues to be within a predetermined numerical range for a predetermined time. In the switch control, the controller switches the heat source unit from either one of the heat pump unit or the gas furnace unit to the other.

In the air conditioning system according to the first aspect of the present invention, the controller generates a capacity command for variably adjusting the operating capacity of the heat source unit, and when the operating capacity level designated in the capacity command continues to be within a predetermined numerical range for a predetermined time, the controller switches the heat source unit from either the heat pump unit or the gas furnace unit to the other. The environmental load is thereby restrained in an air conditioning system in which either the gas furnace unit or the heat pump unit is operated as the heat source unit and the operating capacity of the heat source unit is variably adjusted depending on the circumstances.

Specifically, in the air conditioning system according to the first aspect of the present invention, in the control logic whereby the heat source unit is switched, the operating capacity level included in the capacity command is employed as a parameter, and the heat source unit is switched when an environmental load increase is predicted on the basis of this parameter. As a result, whichever of the heat pump unit and the gas furnace unit has less of an environmental load when driven is operated as the heat source unit. Consequently, the environmental load is restrained.

The environmental load is expressed in units of $kg-CO_2$ or the like, the indicator of which is $CO_2$ production resulting from the energy used by the heat source unit in order to achieve an air-warming effect, for example. Specifically, in the case of electric power, the result of multiplying the factor associated with $CO_2$ emissions from the power supply source by the amount of power used is the environmental load, and the higher the coefficient of performance (COP) in the heat pump unit, the lower the environmental load. In the case of gas, the result of multiplying the factor associated with $CO_2$ emissions from the gas supply source by the amount of gas used or the amount of heat produced is the environmental load, and the higher the combustion efficiency of the gas furnace, the lower the environmental load. The environmental load when the gas furnace unit is being driven must also account for $CO_2$ production resulting from the power consumption of electric components, fans, and/or the like.

An air conditioning system according to a second aspect of the present invention is the air conditioning system according to the first aspect, wherein the controller executes the switch control for switching the heat source unit to the heat pump unit when the gas furnace unit is operating as the heat source unit and a first state is in effect. The first state is a state in which the number of times the gas furnace unit starts and stops during a first time period is equal to or greater than a first threshold.

In the air conditioning system according to the second aspect of the present invention, the controller switches the heat source unit to the heat pump unit when the gas furnace unit is operating as the heat source unit, and the first state is in effect in which the number of times the gas furnace unit starts and stops during the first time period is equal to or greater than the first threshold. The environmental load is thereby restrained with precision in circumstances in which there is concern for an increase in the environmental load.

When the gas furnace unit is operating as the heat source unit and the first state is in effect in which the number of times the gas furnace unit starts and stops during a predetermined time exceeds a predetermined number of times, it is predicted that the environmental load will increase along with a decrease in the heat load process capability. In the air conditioning system according to the second aspect of the present invention, when this first state goes into effect, the heat source unit is switched to the heat pump unit. Consequently, the environmental load is restrained with precision.

An air conditioning system according to a third aspect of the present invention is the air conditioning system according to the second aspect, wherein the first state is a state in which an integrated value of the duty ratio at which the gas furnace unit is in a driving state during a second time period is less than a second threshold.

In the air conditioning system according to the third aspect of the present invention, the first state is a state in which the integrated value of the duty ratio at which the gas furnace unit is in a driving state during the second time period is less than the second threshold. The environmental load is thereby restrained with precision in circumstances in which there is concern for an increase in the environmental load.

Specifically, when the gas furnace unit is operating as the heat source unit and the integrated value of the duty ratio at which the gas furnace unit is in a driving state during the predetermined time falls below a predetermined value, it is predicted that the number of times the gas furnace unit starts and stops during the predetermined time will exceed a predetermined number of times and the environmental load will increase. In the air conditioning system according to the third aspect of the present invention, the heat source unit is switched to the heat pump unit when this first state goes into effect. Consequently, the environmental load is restrained with precision.

An air conditioning system according to a fourth aspect of the present invention is the air conditioning system according to any of the first through third aspects, wherein the controller executes the switch control for switching the heat source unit to the gas furnace unit when the heat pump unit is operating as the heat source unit and a partial load factor during a third time period is equal to or greater than a third threshold.

In the air conditioning system according to the fourth aspect of the present invention, the controller executes switch control for switching the heat source unit to the gas furnace unit when the heat pump unit is operating as the heat source unit and the partial load factor during the third time period is equal to or greater than the third threshold. The environmental load is thereby restrained with precision in circumstances in which there is concern for an increase in the environmental load.

Specifically, when the heat pump unit is operating as the heat source unit and the partial load factor during the third time period is equal to or greater than a predetermined value, it is predicted that the environmental load will increase along with a decrease in the heat load process capability. In the air conditioning system according to the fourth aspect of the present invention, at this time, the heat source unit is switched to the gas furnace unit. Consequently, the environmental load is restrained with precision.

An air conditioning system according to a fifth aspect of the present invention is the air conditioning system according to any of the first through fourth aspects, wherein the controller calculates a first cost and a second cost. The first cost is the cost of operating the gas furnace unit as the heat source unit. The second cost is the cost of operating the heat pump unit as the heat source unit. The controller executes cost-saving control for switching the heat source unit to the heat pump unit when the gas furnace unit is operating as the heat source unit and the first cost is higher than the second cost by a percentage exceeding a first standard value. The controller executes the cost-saving control for switching the heat source unit to the gas furnace unit when the heat pump unit is operating as the heat source unit and the second cost is higher than the first cost by a percentage exceeding a second standard value. The controller executes the switch control with priority over the cost-saving control.

In the air conditioning system according to the fifth aspect, the controller executes the cost-saving control for switching the heat source unit to the heat pump unit when the gas furnace unit is operating as the heat source unit and the first cost is higher than the second cost by a percentage exceeding the first standard value, and switching the heat source unit to the gas furnace unit when the heat pump unit is operating as the heat source unit and the second cost is higher than the first cost by a percentage exceeding the second standard value; and the controller executes the switch control with priority over the cost-saving control. Whichever of the gas furnace unit and the heat pump unit that has the lower cost is thereby operated as the heat source unit in circumstances in which the environmental load is unlikely to increase. Consequently, the cost associated with operation is restrained. The cost is the price of using commercial electricity and/or gas, for example.

An air conditioning system according to a sixth aspect of the present invention is the air conditioning system according to any of the first through fourth aspects, wherein the controller prevents the execution of the switch control from startup until a fourth time period elapses, and/or from execution of the switch control until a fifth time period elapses.

In the air conditioning system according to the sixth aspect of the present invention, the controller prevents the execution of the switch control from startup until the fourth time period elapses, and/or from execution of the switch control until the fifth time period elapses. The environmental load is thereby restrained and the decrease in amenity is restrained.

Specifically, if the heat source unit were to be frequently switched in a short amount of time, it is expected that the environmental load would increase and the amenity would decrease. However, the heat source unit is not likely to be frequently switched in a short amount of time due to heat source unit switching being prevented until the elapse of a predetermined time after air conditioning system startup and after switch control execution. Consequently, the environmental load is unlikely to increase and the amenity is unlikely to decrease. Therefore, the environmental load is restrained and the decrease in amenity is restrained.

An air conditioning system according to a seventh aspect of the present invention is the air conditioning system according to the fifth aspect, wherein the controller prevents execution of the switch control and/or the cost-saving control from startup until a fourth time period elapses, and/or from execution of the switch control or the cost-saving control until a fifth time period elapses.

In the air conditioning system according to the seventh aspect of the present invention, the controller prevents execution of the switch control and/or the cost-saving control from startup until the fourth time period elapses, and/or from execution of the switch control or the cost-saving control until the fifth time period elapses. The environmental load is thereby restrained and the decrease in amenity is restrained.

Specifically, if the heat source unit were to be frequently switched in a short amount of time, it is expected that the environmental load would increase and the amenity would decrease. However, the heat source unit is not likely to be frequently switched in a short amount of time due to heat source unit switching being prevented until the elapse of a predetermined time after air conditioning system startup and after switch control or cost-saving control execution. Consequently, the environmental load is unlikely to increase and the amenity is unlikely to decrease. Therefore, the environmental load is restrained and the decrease in amenity is restrained.

Advantageous Effects of Invention

In the air conditioning system according to the first aspect of the present invention, the environmental load is restrained in an air conditioning system in which either the gas furnace unit or the heat pump unit is operated as the heat source unit, and the operating capacity of the heat source unit is variably adjusted depending on the circumstances.

In the air conditioning system according to the second through fourth aspects of the present invention, the environmental load is restrained with precision.

In the air conditioning system according to the fifth aspect of the present invention, the cost associated with operation is restrained.

In the air conditioning system according to the sixth and seventh aspects of the present invention, the environmental load is restrained and the decrease in amenity is restrained.

DETAILED DESCRIPTION OF EMBODIMENT(S)

An air conditioning system 10 according to an embodiment of the present invention is described below with reference to the drawings. The following embodiment is a specific example of the present invention and is not intended to limit the technical range of the present invention, and modifications can be made as appropriate provided that there is no departure from the scope of the invention.

Air Conditioning System 10

Figure 1:
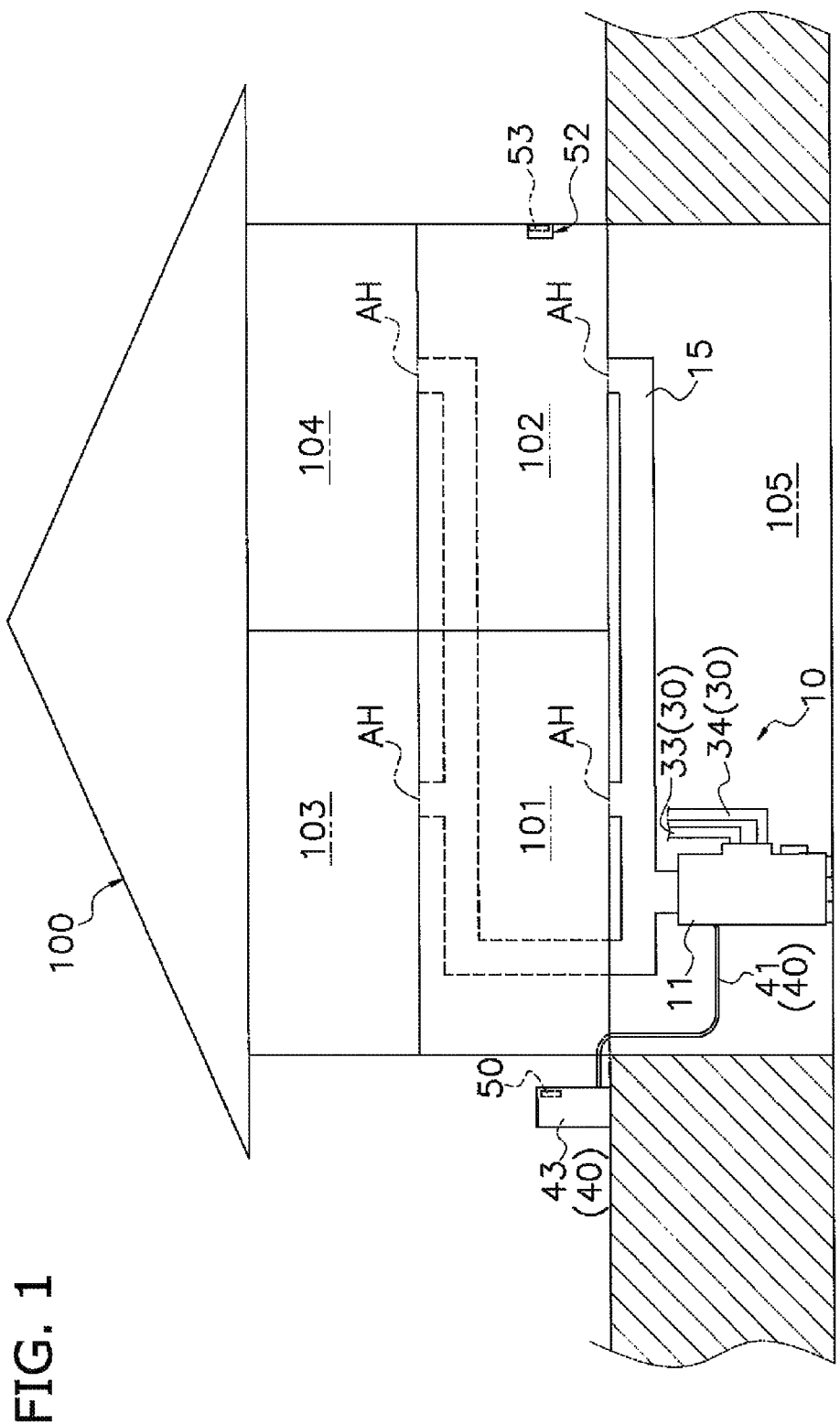
FIG. 1 is a schematic diagram showing the arrangement of an air conditioning system according to an embodiment of the present invention.

FIG. 1 is a schematic diagram showing the arrangement of the air conditioning system 10 according to an embodiment of the present invention. The air conditioning system 10 performs air conditioning in a space to be air-conditioned, and is capable of an air-cooling operation and an air-warming operation. Applications for the air conditioning system 10 include a one-story building such as a house, and low-rise buildings. In the present embodiment, the air conditioning system 10 is installed in a two-story house 100.

The house 100 is furnished with rooms 101 and 102 on a first floor, and rooms 103 and 104 on a second floor. A vent hole AH is formed in each of the rooms 101, 102, 103, and 104. The house 100 is also furnished with a basement 105.

The air conditioning system 10, which is a so-called ducted air conditioning system, comprises primarily a main body casing 11, a duct 15, a fan unit 20, a gas furnace unit (written below as a GF unit) 30, a heat pump unit (written below as an HP unit) 40, and an electrical component unit 52. During the air-cooling operation, the air conditioning system 10 operates the HP unit 40 and performs air conditioning in the rooms 101 to 104. During the air-warming operation, the air conditioning system 10 operates either the GF unit 30 or the HP unit 40 as a heat source unit and performs air conditioning in the rooms 101 to 104 in accordance with a predetermined condition. The components are described below.

Details of Components (2-1) Main Body Casing 11

Figure 2:
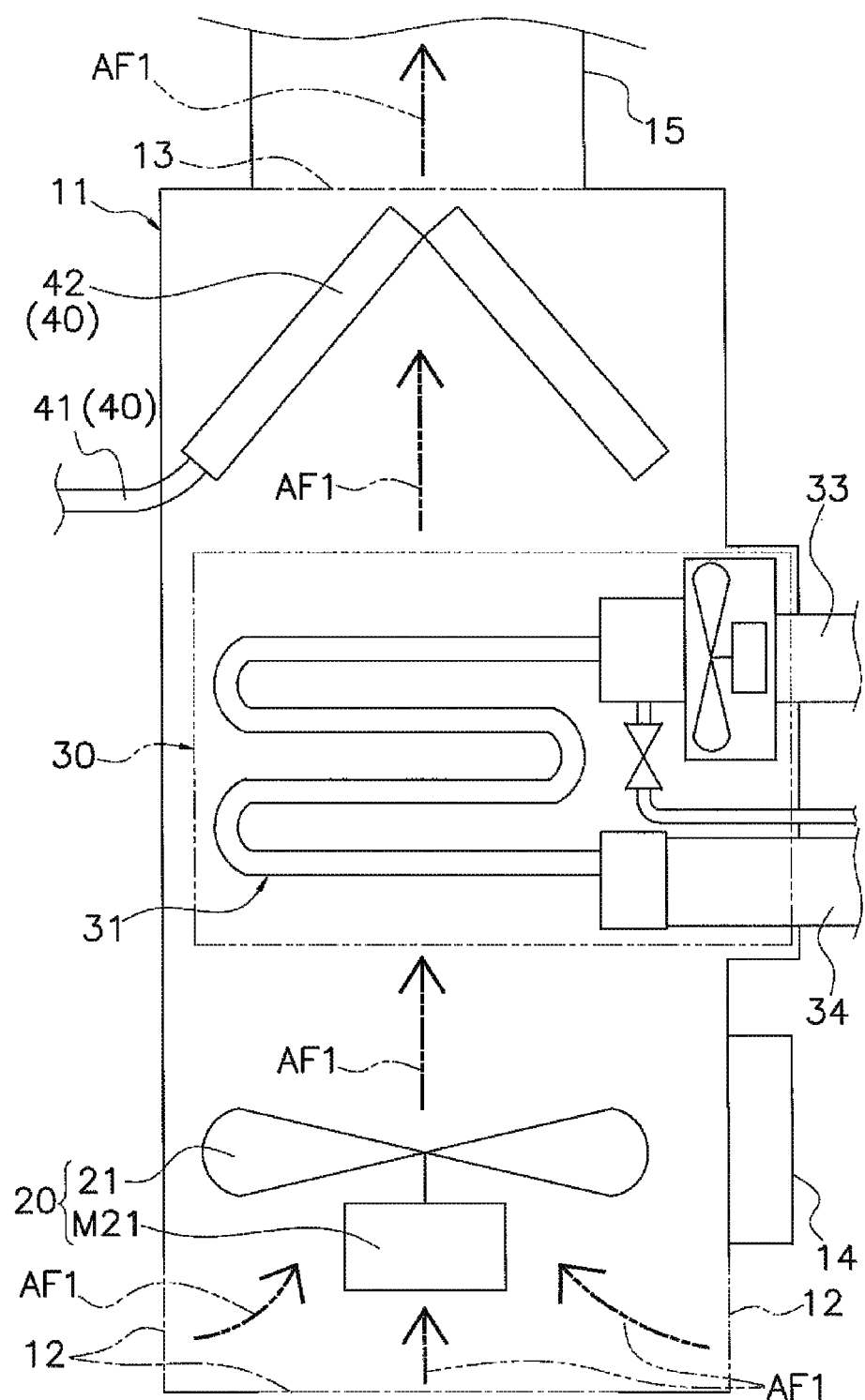
FIG. 2 is a schematic diagram of the interior of the main body casing.

FIG. 2 is a schematic diagram of the interior of the main body casing 11. The main body casing 11 is, for example, a metal case. The fan unit 20, the GF unit 30, and a usage-side heat exchanger 42 (described hereinafter) of the HP unit 40 are placed in the interior of the main body casing 11. Intake ports 12 for taking in air are formed in the bottom of the main body casing 11 and the sides near the bottom. An exhaust port 13 for exhausting the air taken in is formed in the top of the main body casing 11. An electric component box 14 for accommodating various electric components is provided to the side of the main body casing 11. A ventilation port (not shown) for taking in air for cooling the electric components installed in the interior is formed in the electric component box 14.

(2-2) Duct 15

The duct 15 is a metal pipe for feeding air. The duct 15 is connected to the main body casing 11 via the exhaust port 13, and communicates with the interior of the main body casing 11. The duct 15 extends upward from the portion connecting with the main body casing 11, and branches in two partway through. One branch of the bifurcated duct 15 extends along the ceiling of the basement 105, and further branches partway through to connect to the vent hole AH of the room 101 and the vent hole AH of the room 102, thereby communicating with the rooms 101 and 102. The other branch of the bifurcated duct 15 extends upward along the ceiling of the first floor, and further branches partway through to connect to the vent hole AH of the room 103 and the vent hole AH of the room 104, thereby communicating with the rooms 103 and 104. The interior of the main body casing 11 and the rooms 101 to 104 communicate via the duct 15 placed in this manner.

(2-3) Fan Unit 20

The fan unit 20 (equivalent to the "blower" set forth in the claims) is a unit for generating an air flow AF1. The fan unit 20 is placed near the bottom inside the main body casing 11. The fan unit 20 has a fan 21 and a first fan motor M21.

The fan 21 is a blower such as, e.g., a propeller fan or a multi-blade fan. The fan 21 is connected to a rotating shaft of the first fan motor M21. The first fan motor M21 is connected via a cable (not shown) to a first power supply part 211 accommodated in the electric component box 14, and is supplied with power from the first power supply part 211. When the first fan motor M21 is energized and driven, the fan 21 rotates. When the fan 21 rotates, the air flow AF1 is generated.

The air flow AF1 flows via the intake ports 12 into the main body casing 11, passes sequentially through a heat exchange section 31 (described hereinafter) of the GF unit 30 and the usage-side heat exchanger 42 (described hereinafter) of the HP unit 40, and then flows out of the main body casing 11 via the exhaust port 13, and flows into the rooms 101 to 104 via the duct 15 and the vent holes AH.

(2-4) GF Unit (Gas Furnace Unit) 30

Figure 3:
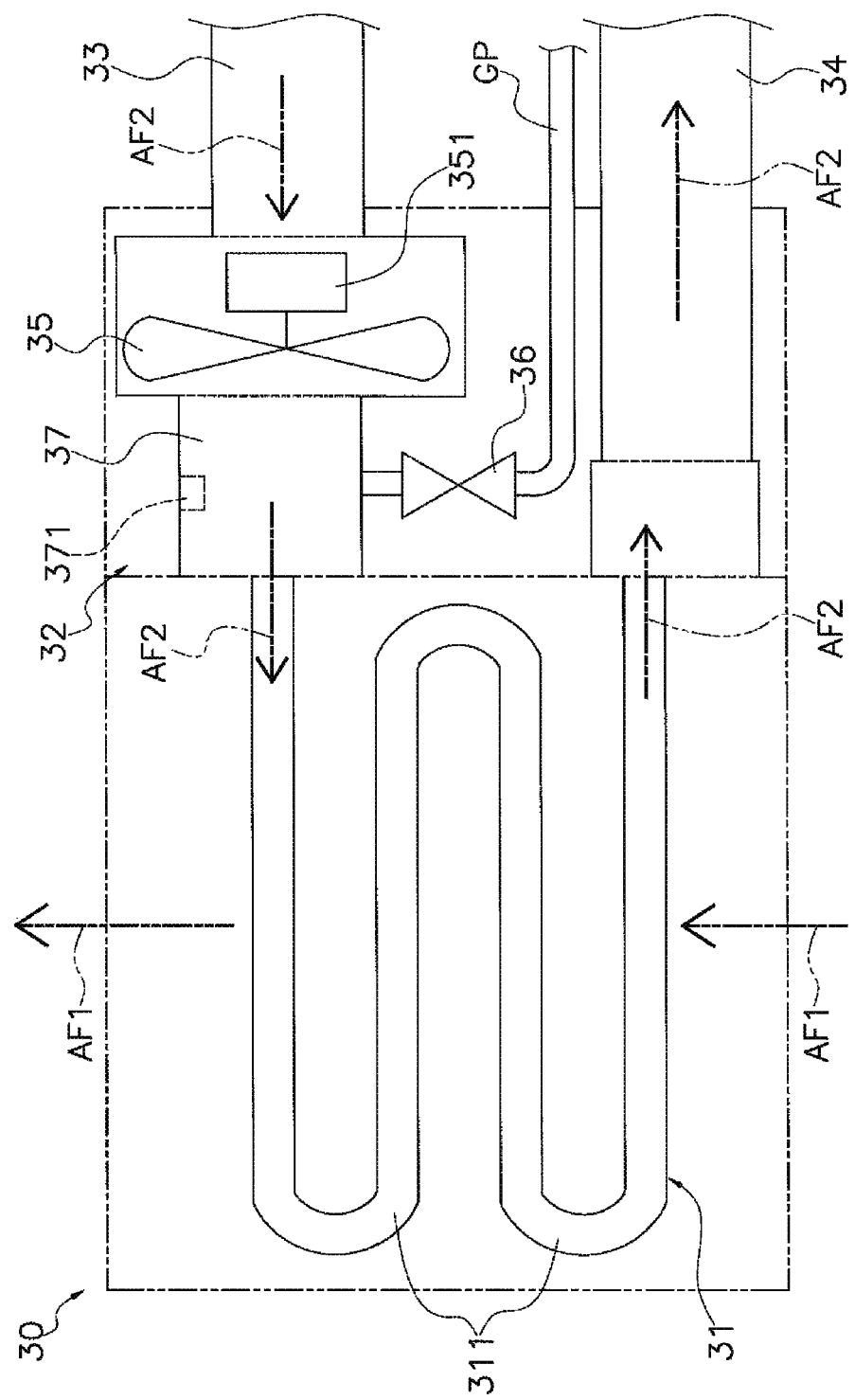
FIG. 3 is a schematic diagram of the gas furnace unit.

FIG. 3 is a schematic diagram of the GF unit 30. The GF unit 30 is driven as the heat source unit when a predetermined condition is fulfilled during the air-warming operation. The GF unit 30 is including primarily the heat exchange section 31, a main body part 32, an air supply duct 33, and an exhaust duct 34.

(2-4-1) Heat Exchange Section 31

The heat exchange section 31 is provided in the flow path through which the air flow AF1 passes inside the main body casing 11. Specifically, the heat exchange section 31 includes a combustion gas pipe 311 placed inside the main body casing 11. When the air flow AF1 is generated while a combustion gas (described hereinafter) is present inside the combustion gas pipe 311, heat exchange takes place between the air flow AF1 and the heat exchange section 31. Specifically, when the GF unit 30 is operated as the heat source unit, the heat exchange section 31 functions as a "heating section" for heating the passing air flow AF1.

(2-4-2) Main Body Part 32

The main body part 32 is located adjacent to the heat exchange section 31. Accommodated inside the main body part 32 are primarily a fan 35, a gas valve 36, and a combustion part 37.

The fan 35 is a blower such as, e.g., a propeller fan or a multi-blade fan. The fan 35 is connected to a rotating shaft of a second fan motor 351. The second fan motor 351 is connected via a cable (not shown) to a second power supply part 352 placed inside the electric component box 14, and is supplied with power from the second power supply part 352. When the second fan motor 351 is energized and driven, the fan 35 rotates in association therewith and an air flow AF2 is generated. The air flow AF2 flows from outside into the main body part 32 via the air supply duct 33 connected to the main body part 32, passes through the combustion part 37 and the combustion gas pipe 311, and flows to the outside via the exhaust duct 34.

The gas valve 36 is a valve such as, e.g., an electromagnetic valve. The gas valve 36 is placed in a gas pipe GP extending from the outside of the main body part 32 to the combustion part 37. The gas pipe GP is a commercial gas pipe for supplying a fuel gas such as, e.g., liquefied natural gas or liquefied petroleum gas that has been gasified. The gas valve 36 is connected via a cable (not shown) to a gas valve opening/closing part 361 placed inside the electric component box 14, and the opening and closing of the gas valve is controlled. When the gas valve 36 is opened, the fuel gas flowing through the gas pipe GP flows into the combustion part 37 and mixes with air included in the air flow AF2. When the gas valve 36 is closed, the supply of fuel gas into the combustion part 37 is stopped.

The gas pipe GP is connected to the combustion part 37. A plug 371 is placed in the combustion part 37. The plug 371 is connected via a cable (not shown) to a plug power supply part 372 placed inside the electric component box 14, and is supplied with power. When the gas valve 36 is opened and the fan 35 is driven, the air flow AF2 and the fuel gas are mixed together inside the combustion part 37. In this state, when power is supplied from the plug power supply part 372 to the plug 371, electric discharge is produced and ignition takes place. The mixed gas thereby combusts to become the combustion gas.

One end of the combustion gas pipe 311 is connected to the combustion part 37, and the combustion gas flows as the air flow AF2 into the combustion gas pipe 311. Having flowed into the combustion gas pipe 311, the combustion gas exchanges heat with the air flow AF1 when passing through the combustion gas pipe 311, and then flows into the exhaust duct 34 connected to the other end of the combustion gas pipe 311.

(2-4-3) Air Supply Duct 33 and Exhaust Duct 34

The air supply duct 33 and the exhaust duct 34 are pipes, e.g., made of metal, and extending from the outside to the basement 105. The air supply duct 33 has an air supply port located outside, and the exhaust duct 34 has a discharge port located outside. The air supply duct 33 is connected to one end of the combustion gas pipe 311 via the combustion part 37 or the like, and the exhaust duct 34 is connected to the other end of the combustion gas pipe 311. The air supply duct 33 and the exhaust duct 34 extend along the ceiling of the basement 105, and the air supply port and exhaust port are secured to the outer wall or the like of the house 100 (not shown).

Outdoor air that has flowed into the air supply duct 33 via the air supply port when the fan 35 is driven passes through the combustion part 37 and flows into the exhaust duct 34. Exhaust gas that has flowed into the exhaust duct 34 when the fan 35 is driven passes through the exhaust duct 34 to be discharged out of the house 100.

(2-5) HP Unit (Heat Pump Unit) 40

Figure 4:
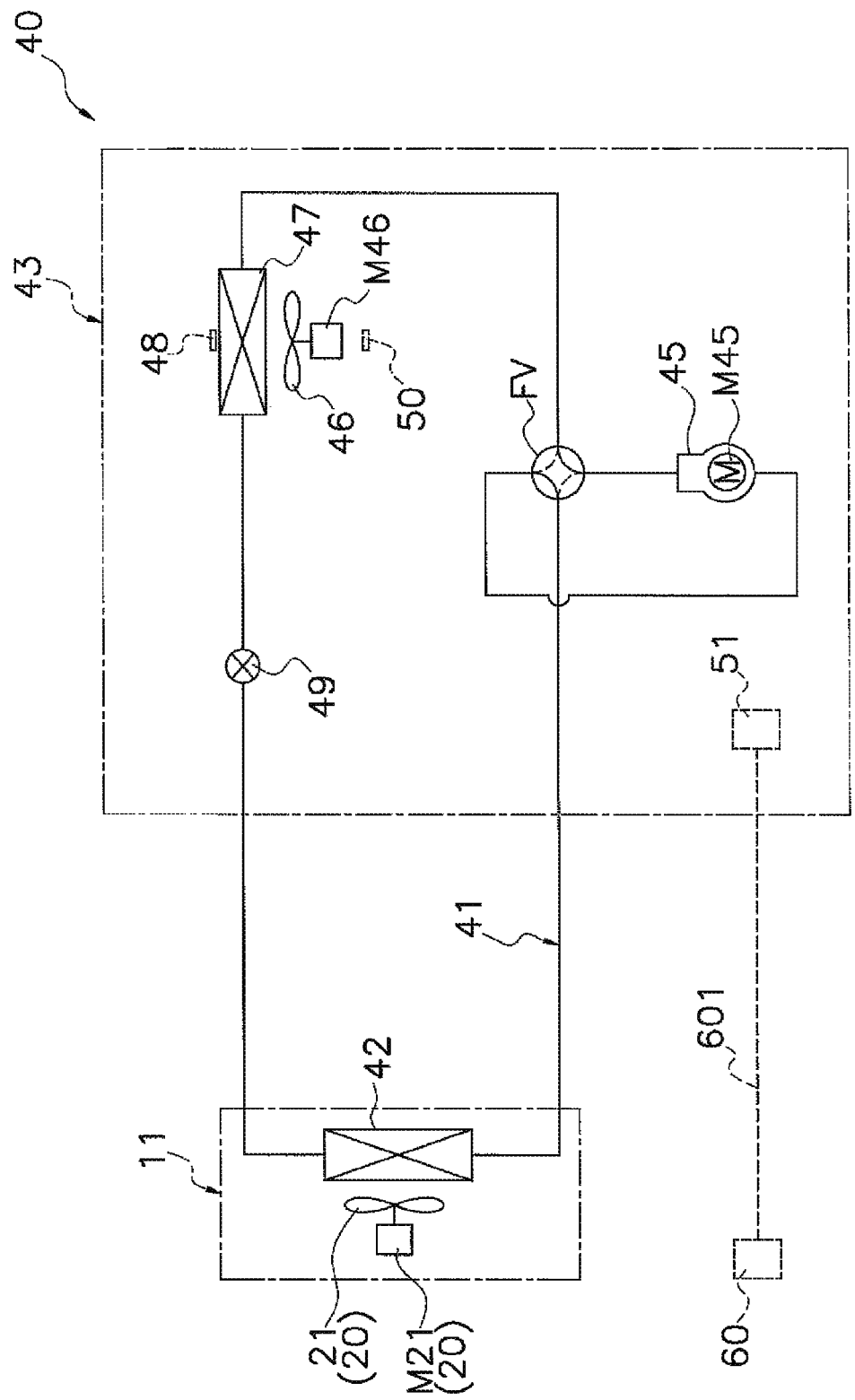
FIG. 4 is a refrigerant circuit diagram of the heat pump unit.

FIG. 4 is a refrigerant circuit diagram of the HP unit 40. The HP unit 40 is driven during the air-cooling operation, and is driven as the heat source unit when a predetermined condition is fulfilled during the air-warming operation. The HP unit 40 has primarily a refrigerant pipe 41, the usage-side heat exchanger 42, and an outdoor unit 43, and a refrigerant circuit is configured in the HP unit 40 by connecting these components.

(2-5-1) Refrigerant Pipe 41

The refrigerant pipe 41 is made, e.g., of copper, and refrigerant flows through the interior. The refrigerant pipe 41 connects the usage-side heat exchanger 42 and the outdoor unit 43.

(2-5-2) Usage-Side Heat Exchanger 42

The usage-side heat exchanger 42 (equivalent to the "radiator" set forth in the claims) is, e.g., a cross-fin or micro-channel heat exchanger. The usage-side heat exchanger 42 includes a heat transfer tube (not shown) through which refrigerant flows. The refrigerant pipe 41 is connected to both the inflow port and outflow port of the heat transfer tube. The usage-side heat exchanger 42 is placed inside the main body casing 11 so as to be positioned above the fan unit 20 and the heat exchange section 31 of the GF unit 30. In other words, the usage-side heat exchanger 42 is positioned farther downstream along the air flow AF1 than the fan unit 20 and the heat exchange section 31 of the GF unit 30. The usage-side heat exchanger 42 arranged in this manner is configured so that heat exchange takes place between the air flow AF1 and the refrigerant flowing through the heat transfer tube when the air flow AF1 passes through the usage-side heat exchanger 42 while the HP unit 40 is operating. The usage-side heat exchanger 42 functions as an evaporator of refrigerant during the air-cooling operation. The usage-side heat exchanger 42 also functions as a condenser or radiator of refrigerant when the HP unit 40 operates as the heat source unit during the air-warming operation.

(2-5-3) Outdoor Unit 43

The outdoor unit 43 is installed on the outside. The outdoor unit 43 has, in the interior, primarily a four-way switching valve FV, a compressor 45, an outdoor fan 46, an outdoor heat exchanger 47, a refrigerant temperature sensor 48, an expansion valve 49, an outdoor air temperature sensor 50, and an outdoor unit control part 51.

The four-way switching valve FV is used for switching the direction of refrigerant flow during a switch between the air-cooling operation and the air-warming operation. The four-way switching valve FV is connected (not shown) via a cable to the outdoor unit control part 51, and the flow path is switched by the outdoor unit control part 51. Specifically, during the air-cooling operation, the four-way switching valve FV switches the refrigerant flow path so that gas refrigerant evaporated in the usage-side heat exchanger 42 flows into the compressor 45, and discharge gas discharged from the compressor 45 flows into the outdoor heat exchanger 47 (refer to the solid lines within the four-way switching valve FV in FIG. 4). During the air-warming operation, the four-way switching valve FV switches the refrigerant flow path so that gas refrigerant evaporated in the outdoor heat exchanger 47 flows into the compressor 45, and discharge gas discharged from the compressor 45 flows into the usage-side heat exchanger 42 (refer to the dashed lines within the four-way switching valve FV in FIG. 4).

The compressor 45 is a mechanism for taking in low-pressure gas refrigerant, compressing the refrigerant, and discharging it as high-pressure gas refrigerant. The compressor 45 is a positive displacement compressor such as, e.g., a rotary or scroll compressor. Moreover, the compressor 45 is, e.g., a sealed type electric compressor in which a compressor motor M45 as a drive source is accommodated inside a casing (not shown). The compressor motor M45 is, e.g., a three-phase brushless DC motor. The rotational speed of the compressor motor M45 is adjusted as appropriate by the outdoor unit control part 51. The operating capacity of the HP unit 40 is thereby variably controlled.

The outdoor fan 46 is a blower such as, e.g., a propeller fan. The outdoor fan 46 is connected to a rotating shaft of an outdoor fan motor M46. The outdoor fan motor M46 is connected via a cable (not shown) to an outdoor fan power supply part (not shown) included in the outdoor unit control part 51, described hereinafter, and is supplied with power. When the outdoor fan motor M46 is energized and driven, the outdoor fan 46 is rotated, generating an air flow which flows into the outdoor unit 43 from the exterior and passes through the outdoor heat exchanger 47.

The outdoor heat exchanger 47 is, e.g., a cross-fin or micro-channel heat exchanger. The outdoor heat exchanger 47 includes a heat transfer tube (not shown) through which refrigerant flows. The refrigerant pipe 41 is connected to both the inflow port and outflow port of the heat transfer tube. The outdoor heat exchanger 47 is configured so that when the air flow generated by the outdoor fan 46 passes through, heat exchange takes place between the air flow and the refrigerant flowing through the heat transfer tube. The outdoor heat exchanger 47 functions as a condenser of refrigerant during the air-cooling operation. During the air-warming operation, the outdoor heat exchanger functions as an evaporator of refrigerant.

The refrigerant temperature sensor 48 is a sensor such as, e.g., a thermocouple or a thermistor. The refrigerant temperature sensor 48 detects the temperature of refrigerant flowing inside the outdoor heat exchanger 47. The refrigerant temperature sensor 48, which is connected to the outdoor unit control part 51 via a cable (not shown), outputs an analog signal of the detected value.

The expansion valve 49 is configured from, e.g., an electric valve. The expansion valve 49 is positioned between the usage-side heat exchanger 42 and the outdoor heat exchanger 47. The expansion valve 49 depressurizes high-pressure liquid refrigerant that has condensed in the usage-side heat exchanger 42 or the outdoor heat exchanger 47. The expansion valve 49 is connected (not shown) with the outdoor unit control part 51 via a cable, and the opening degree is adjusted as appropriate by the outdoor unit control part 51.

The outdoor air temperature sensor 50 is a sensor such as, e.g., a thermocouple or a thermistor. In the present embodiment, the outdoor air temperature sensor 50 is installed in the outdoor unit 43. The outdoor air temperature sensor 50 detects the temperature of outdoor air as an outdoor air temperature To. The outdoor air temperature sensor 50 is connected to the outdoor unit control part 51 via a cable (not shown), and outputs an analog signal of the detected value. The outdoor air temperature sensor 50 need not be placed inside the outdoor unit 43, and may be installed, e.g., on an outer wall, etc., of the house 100.

The outdoor unit control part 51 is a microcomputer including a CPU, memory, and/or the like. The outdoor unit control part 51 includes an inverter (not shown) for adjusting the rotational speed of the compressor motor M45. The outdoor unit control part 51 includes the outdoor fan power supply part for supplying power to the outdoor fan motor M46. The outdoor unit control part 51, which is connected to a controller 60 (described hereinafter) via a cable 601, conducts the sending and receiving of signals. Specifically, the outdoor unit control part 51 receives a command from the controller 60 and causes the inverter and the outdoor fan power supply part to function. The compressor motor M45 is thereby driven at the designated rotational speed, and the outdoor fan motor M46 is driven. The outdoor unit control part 51 receives the analog signal outputted from the outdoor air temperature sensor 50, and converts the signal from analog to digital to create outdoor air temperature information. The outdoor unit control part 51 sends the created outdoor air temperature information as appropriate to the controller 60.

(2-6) Electrical Component Unit 52

The electrical component unit 52 is a unit including various electric components. The electrical component unit 52 is installed on a side wall in the room 102. The electrical component unit 52 includes primarily a room temperature sensor 53, an input part 54, a display part 55, and the controller 60.

(2-6-1) Room Temperature Sensor 53

The room temperature sensor 53 includes a sensor such as, e.g., a thermocouple or a thermistor. The room temperature sensor 53 detects the temperature within the room 102. Specifically, the room temperature sensor 53 detects an indoor temperature Ti (described hereinafter). The room temperature sensor 53 includes an interface (not shown) having a communication function and an AD conversion function. The room temperature sensor 53 is connected to the controller 60 via the cable 601 (see FIG. 5). The room temperature sensor 53 sends a digital signal, which is the detected value converted from analog to digital, to the controller 60. The room temperature sensor 53 is placed inside the room 102 in the present embodiment, but does not necessarily need to be placed inside the room 102; the sensor 53 may be installed in a room other than the room 102 of the house 100.

(2-6-2) Input Part 54

The input part 54 is configured from, e.g., input keys, a touch panel, and/or the like (not shown). Commands are inputted to the input part 54 by a user. For example, a user inputs commands such as initiating the air-cooling operation, initiating the air-warming operation, stopping operation, selecting a set temperature and the like via the input part 54. The input part 54 is connected to the controller 60 via the cable 601 (see FIG. 5). The input part 54 sends a command signal corresponding to the inputted command to the controller 60.

(2-6-3) Display Part 55

The display part 55 includes e.g., an LED light, a liquid crystal panel, and/or the like (not shown). The display part 55, which is connected to the controller 60 via the cable 601 (see FIG. 5), receives display data signals from the controller 60. The display part 55 displays the circumstances under which the air conditioning system 10 has been actuated (whether or not the system is operating, the set temperature, etc.), the room temperature, and/or the like on the basis of the received display data signals.

(2-6-4) Controller 60

The controller 60 is a microcomputer including RAM, ROM, a CPU, and the like. The controller 60 conducts the sending and receiving of signals with, or controls the actions of, the components connected via the cables 601. Specifically, the controller 60 controls the actions of units such as the fan unit 20, the GF unit 30, and the HP unit 40. The details of the controller 60 are described in the section "(3) Details of the controller 60" below.

Details of the Controller 60

Figure 5:
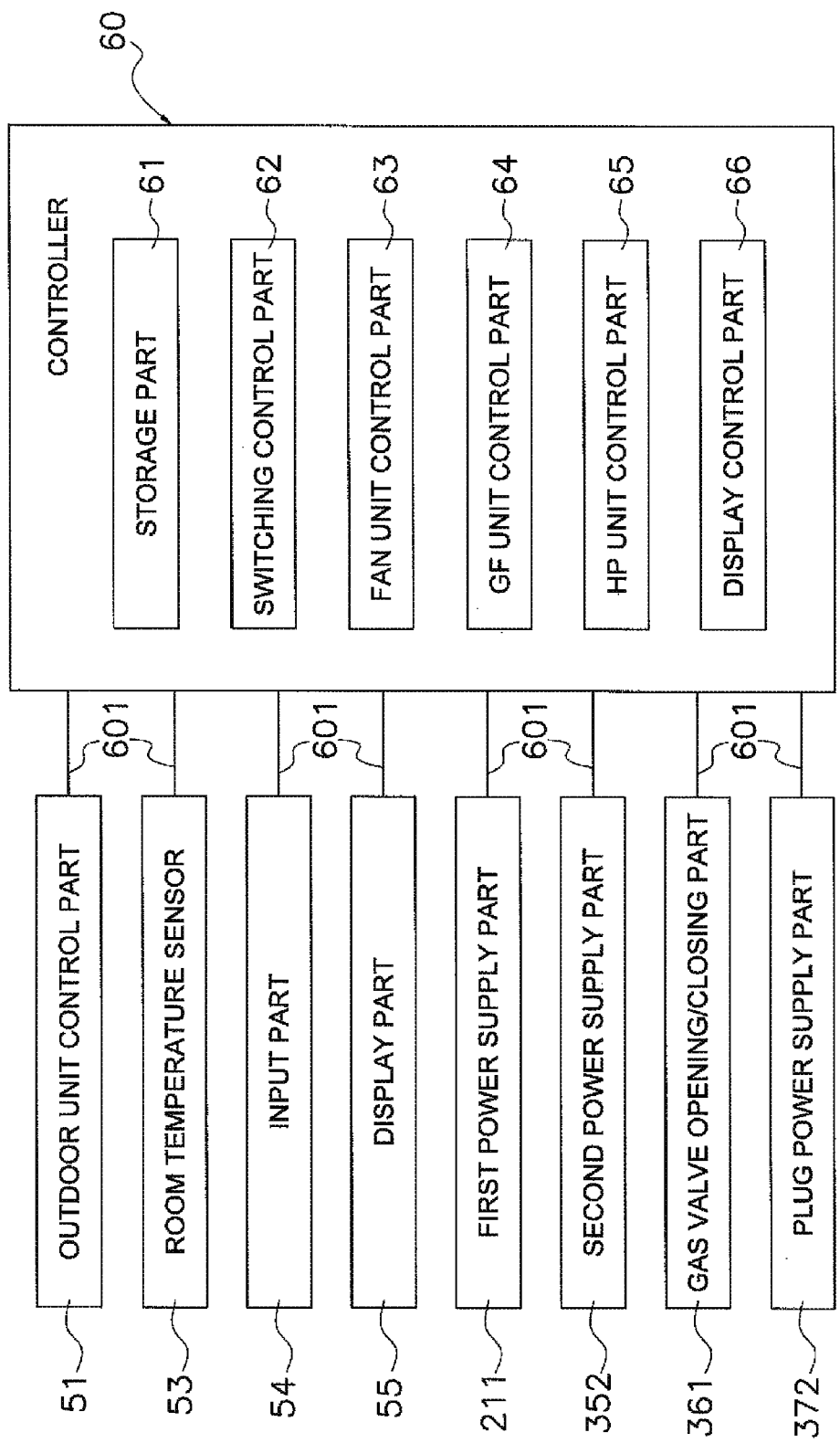
FIG. 5 is a schematic diagram showing the configuration of the controller and the devices connected to the controller.

FIG. 5 is a schematic diagram showing the general configuration of the controller 60 and the devices connected to the controller 60. The controller 60 is connected via the cables 601 primarily with the outdoor unit control part 51, the room temperature sensor 53, the input part 54, the display part 55, the first power supply part 211, the second power supply part 352, the gas valve opening/closing part 361, and the plug power supply part 372.

The controller 60 includes primarily a storage part 61, a switching control part 62, a fan unit control part 63, a gas furnace unit control part (written below as a GF unit control part) 64, a heat pump unit control part (written below as an HP unit control part) 65, and a display control part 66. These are described below.

(3-1) Storage Part 61

The storage part 61 retains control programs executed in the switching control part 62, the fan unit control part 63, the GF unit control part 64, the HP unit control part 65, and the display control part 66. The storage part 61 retains a digital signal, which is sent from the room temperature sensor 53 each elapse of a predetermined time period (e.g. 1 minute), as an indoor temperature (written below as room temperature) Ti. The storage part 61 receives outdoor air temperature information sent from the outdoor unit control part 51 at each elapse of a predetermined time period (e.g. 1 minute), and retains the information as the outdoor air temperature To. The storage part 61 deciphers command signals sent from the input part 54, and extracts and retains air-cooling operation initiation commands, air-warming operation initiation commands, operation stop commands, set temperatures Tp, and the like.

(3-2) Switching Control Part 62

Figure 6:
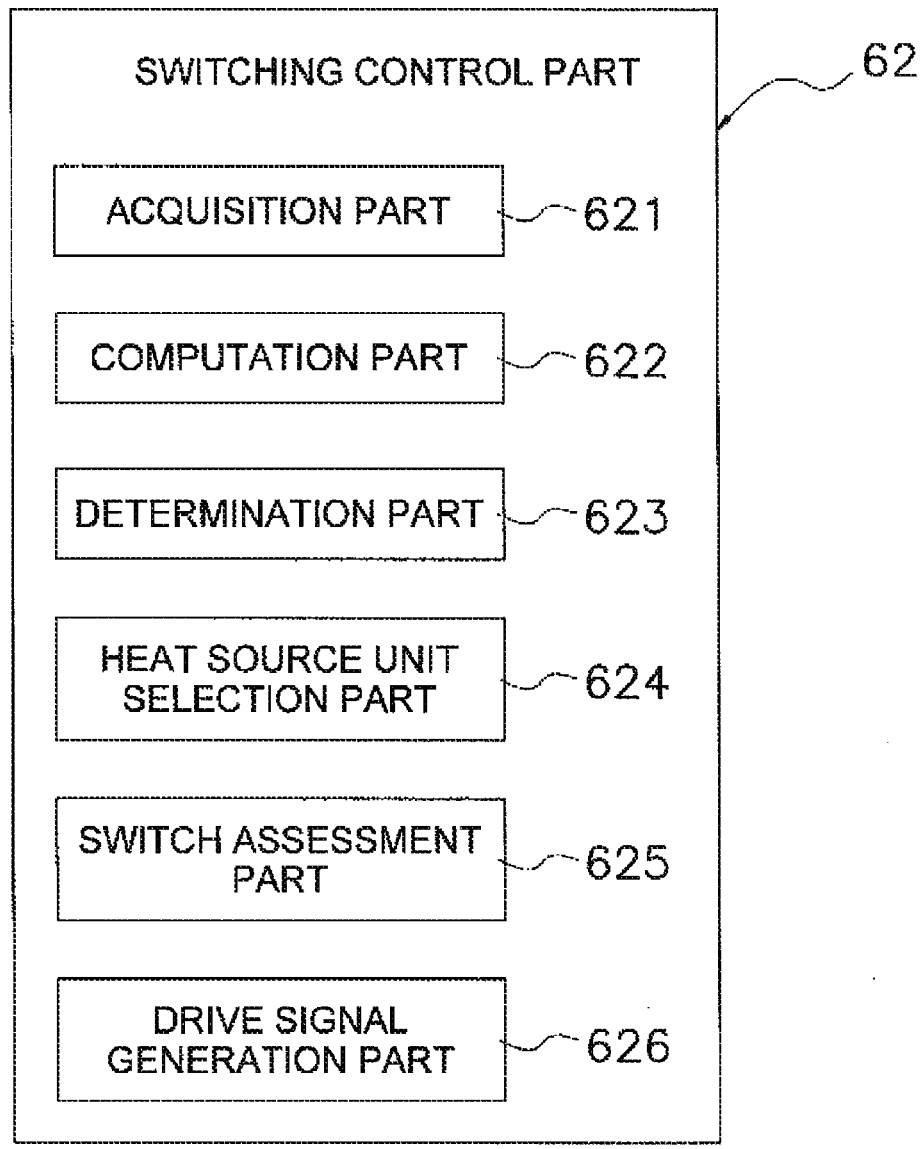
FIG. 6 is a schematic diagram showing the configuration of the switching control part.

FIG. 6 is a schematic diagram showing the configuration of the switching control part 62. The switching control part 62 performs control pertaining to selecting or switching the heat source unit of the air conditioning system 10. The details of the selection or switching of the heat source unit by the switching control part 62 are described in the forthcoming section "(4) Flow of the process of the switching control part 62 during the air-warming operation." The switching control part 62 has primarily an acquisition part 621, a computation part 622, a determination part 623, the heat source unit selection part 624, a switch assessment part 625, and a drive signal generation part 626.

(3-2-1) Acquisition Part 621

When power is turned on, the acquisition part 621 first acquires a control program from the storage part 61. Next, the acquisition part 621 acquires a user command from the storage part 61 in accordance with the control program. Specifically, when the air-cooling operation initiation command, the air-warming operation initiation command, or the operation stop command is stored in the storage part 61, the acquisition part 621 acquires the command in real time.

The acquisition part 621 acquires the outdoor air temperature To, the room temperature Ti, or the set temperature Tp from the storage part 61 at a predetermined timing in accordance with the control program. Specifically, when the acquisition part 621 has acquired the air-cooling operation initiation command, the acquisition part 621 outputs an air-cooling operation initiation signal to the drive signal generation part 626, and also acquires the room temperature Ti and the set temperature Tp and outputs them to the computation part 622.

When the acquisition part 621 has acquired the air-warming operation initiation command, and also when the acquisition part 621 has acquired a switch allowing signal (described hereinafter) from the switch assessment part 625, the acquisition part 621 acquires the outdoor air temperature To. When the acquisition part 621 has received an HP unit selection signal (described hereinafter) or a GF unit selection signal (described hereinafter) from the heat source unit selection part 624, the acquisition part 621 acquires the outdoor air temperature To, the room temperature Ti, and the set temperature Tp. The acquisition part 621 outputs the acquired outdoor air temperature To to the determination part 623. The acquisition part 621 outputs the acquired outdoor air temperature To, room temperature Ti, and set temperature Tp to the computation part 622.

(3-2-2) Computation Part 622

The computation part 622 calculates a heat load on the basis of the outdoor air temperature To, the room temperature Ti, and the set temperature Tp outputted from the acquisition part 621. The computation part 622 outputs the calculated heat load to the drive signal generation part 626. Mathematical formulas, tables, and/or the like for calculating the heat load from the outdoor air temperature To, the room temperature Ti, and the set temperature Tp are programmed in the control program, and the computation part 622 calculates the heat load in accordance with the control program.

During the air-cooling operation, the computation part 622 outputs the calculated heat load to the drive signal generation part 626. During the air-warming operation, after calculating the heat load, the computation part 622 calculates a first cost Gc of when the GF unit 30 is driven and a second cost Hc of when the HP unit 40 is driven. Specifically, programmed into the control program are tables, mathematical formulas, and/or the like which define the correlation between the heat load, the environmental load per unit time of the GF unit 30 and HP unit 40, and the usage feeds of commercial power and commercial gas per unit time, and the first cost Gc and second cost Hc are calculated in accordance with the control program. The computation part 622 outputs the calculated first cost Gc and second cost Hc to the determination part 623.

(3-2-3) Determination Part 623

The determination part 623 performs various determinations in accordance with the control program at predetermined timings. The determinations performed by the determination part 623 are described below.

(3-2-3-1) Outdoor Air Temperature Determination

On receiving the outdoor air temperature To outputted from the acquisition part 621, the determination part 623 performs an outdoor air temperature determination, which is a determination of whether or not the outdoor air temperature To is equal to or greater than a predetermined set value Pv1. The set value Pv1 is set in the control program in advance as a value of the outdoor air temperature To that fulfills a condition that if the outdoor air temperature To is less than the set value Pv1 during the air-warming operation, operating the GF unit 30 as the heat source unit has less of an environmental load than operating the HP unit 40 as the heat source unit. In the present embodiment, the set value Pv1 is set to 0 (° C.).

When the result of the outdoor air temperature determination is that the outdoor air temperature To is equal to or greater than the set value Pv1, the determination part 623 outputs a high-outdoor-air-temperature determination signal indicating that to the heat source unit selection part 624. When the outdoor air temperature To is less than the set value Pv1, the determination part 623 outputs a low-outdoor-air-temperature determination signal indicating that to the heat source unit selection part 624.

(3-2-3-2) GF Capacity Determination

When the determination part 623 receives a GF capacity setting signal (described hereinafter) outputted from the drive signal generation part 626, the determination part 623 retains this signal. The determination part 623, which has a working memory (not shown), can retain a predetermined number of the GF capacity setting signals. The determination part 623 then performs a GF capacity determination when the retained number of the GF capacity setting signals reaches a set number Pn1.

Specifically, in the GF capacity determination, the determination part 623 calculates the average value of the operating capacity level of the GF unit 30 included in the retained GF capacity setting signals. On the basis of the calculated average value of the operating capacity level, the determination part 623 calculates an integrated value Iv1 of a duty ratio with which the GF unit 30 is operated as the heat source unit at each elapse of a predetermined time period P1. Programmed into the control program is a table that defines the correlation between the average value of the operating capacity level of the GF unit 30 and the integrated value Iv1 of the duty ratio, and the determination part 623 calculates the integrated value Iv1 of the duty ratio in accordance with the control program. The determination part 623 then determines whether or not the calculated integrated value Iv1 of the duty ratio is equal to or greater than a second threshold ΔTh2.

The integrated value Iv1 of the duty ratio is a percentage of the time during which the GF unit 30 is driven during the predetermined time period P1 when the GF unit 30 has been selected as the heat source unit. The set number Pn1 is set according to the predetermined time period P1, and in the present embodiment, the set number is set to 30 so that the predetermined time period P1 is 30 minutes.

The value selected for the second threshold ΔTh2 fulfills the condition that if the integrated value Iv1 of the duty ratio is less than the second threshold ΔTh2, it is estimated that the number of times the GF unit 30 is started and stopped during the predetermined time period P1 is equal to or greater than a first threshold ΔTh1. The second threshold ΔTh2 is set in advance in the control program. In the present embodiment, the second threshold ΔTh2 is set to 30 percent, for example.

The value selected for the first threshold ΔTh1 fulfills the condition that if the number of times the GF unit 30 is started and stopped during the predetermined time period P1 in the air-warming operation is equal to or greater than the first threshold ΔTh1, the GF unit 30 is repeatedly started and stopped in a short amount of time and there will be concern for an increase in the environmental load. The number of times the GF unit 30 is started and stopped is a number of times the GF unit 30 goes from a non-driven state to a driven state.

In the present embodiment, the second threshold ΔTh2 is set on the premise that the first threshold ΔTh1 is five times.

When the integrated value Iv1 of the duty ratio is less than the second threshold ΔTh2 in the GF capacity determination, the determination part 623 outputs a small-GF-capacity determination signal indicating that to the heat source unit selection part 624.

(3-2-3-3) HP Capacity Determination

Upon receiving an HP capacity setting signal (described hereinafter) outputted from the drive signal generation part 626, the determination part 623 retains this signal. The determination part 623 has a working memory (not shown) and can retain a predetermined number of the HP capacity setting signals. The determination part 623 performs an HP capacity determination when the number of the retained HP capacity setting signals reaches a set number Pn2.

Specifically, in the HP capacity determination, the determination part 623 calculates the average value of the operating capacity level of the HP unit 40 included in the retained HP capacity setting signals. On the basis of the calculated average value of the operating capacity level, the determination part 623 calculates an average value Av1 of a partial load factor. Programmed into the control program is a table that defines the correlation between the average value of the operating capacity level of the HP unit 40 and the average value Av1 of the partial load factor, and the determination part 623 calculates the average value Av1 of the partial load factor in accordance with the control program. The determination part 623 then determines whether or not the calculated average value Av1 of the partial load factor is less than a third threshold ΔTh3.

The partial load factor is the value of the air-warming capability of the HP unit 40 divided by a rated capability. The average value Av1 of the partial load factor is the average value of the partial load factor during the predetermined time period P2 when the HP unit 40 has been selected as the heat source unit during the air-warming operation. The set number Pn2 is set according to the predetermined time period P2, and in the present embodiment, the set number is set to 30 so that the predetermined time period P2 is 30 minutes.

The value selected as the third threshold ΔTh3 fulfills the condition that operating the GF unit 30 rather than the HP unit 40 as the heat source unit imposes less of the environmental load if the average value Av1 of the partial load factor is equal to or greater than the third threshold ΔTh3 during the air-warming operation. The third threshold value ΔTh3 is set in advance in the control program. In the present embodiment, the third threshold ΔTh3 is set to 90 percent, for example.

In the HP capacity determination, when the average value Av1 of the partial load factor is equal to or greater than the third threshold ΔTh3, the determination part 623 outputs a large-HP-capacity determination signal indicating that to the heat source unit selection part 624.

(3-2-3-4) Cost-Saving Determination

Upon receiving the first cost Gc and the second cost Hc outputted from the computation part 622, the determination part 623 performs a cost-saving determination of comparing the first cost Gc and the second cost Hc.

Specifically, when the GF unit 30 is operating as the heat source unit, the determination part 623 performs the cost-saving determination for determining whether or not the first cost Gc is greater than the second cost Hc by a percentage exceeding a predetermined first standard value Sv1. More specifically, the determination part 623 determines whether or not the value of the first cost Gc divided by the second cost Hc exceeds the first standard value Sv1. When the result of the cost-saving determination is that the first cost Gc is greater than the second cost Hc by a percentage exceeding the first standard value Sv1, the determination part 623 outputs a high-first-cost determination signal indicating that to the heat source unit selection part 624. When the result of the cost-saving determination is that the first cost Gc is not greater than the second cost Hc by a percentage exceeding the first standard value Sv1, the determination part 623 outputs a low-first-cost determination signal indicating that to the heat source unit selection part 624. The first standard value Sv1 is a value set in advance in the control program. In the present embodiment, the first standard value Sv1 is set to 1.1.

When the HP unit 40 is operating as the heat source unit during the air-warming operation, the determination part 623 performs the cost-saving determination for determining whether or not the second cost Hc is greater than the first cost Gc by a percentage exceeding a predetermined second standard value Sv2. More specifically, the determination part 623 determines whether or not the value of the second cost Hc divided by the first cost Gc exceeds than the second standard value Sv2. When the result of the cost-saving determination is that the second cost Hc is greater than the first cost Gc by a percentage exceeding the second standard value Sv2, the determination part 623 outputs a high-second-cost determination signal indicating that to the heat source unit selection part 624. When the result of the cost-saving determination is that the second cost Hc is not greater than the first cost Gc by a percentage exceeding the second standard value Sv2, the determination part 623 outputs a low-second-cost determination signal indicating that to the heat source unit selection part 624. The second standard value Sv2 is a value set in advance in the control program. In the present embodiment, the second standard value Sv2 is set to 1.1, similar to the first standard value Sv1.

(3-2-4) Heat Source Unit Selection Part 624

Upon receiving the low-outdoor-air-temperature determination signal, the large-HP-capacity determination signal, the low-first-cost determination signal, or the high-second-cost determination signal from the determination part 623, the heat source unit selection part 624 outputs to the acquisition part 621 and the drive signal generation part 626 a gas furnace unit selection signal (written below as a GF unit selection signal) for selecting the GF unit 30 rather than the HP unit 40 as the heat source unit during the air-warming operation.

Upon further receiving the small-GF-capacity determination signal, the high-first-cost determination signal, or the low-second-cost determination signal after having received the high-outdoor-air-temperature determination signal from the determination part 623, the heat source unit selection part 624 outputs to the acquisition part 621 and the drive signal generation part 626 a heat pump unit selection signal (written below as an HP unit selection signal) for selecting the HP unit 40 rather than the GF unit 30 as the heat source unit.

Upon receiving a switch prevention signal (described hereinafter) outputted from the switch assessment part 625, the heat source unit selection part 624 outputs the same signal as the previously outputted signal to the acquisition part 621 and the drive signal generation part 626. For example, when the switch prevention signal outputted from the switch assessment part 625 is received in a case in which the previously outputted signal is the GF unit selection signal, the heat source unit selection part 624 outputs the GF unit selection signal to the acquisition part 621 and the drive signal generation part 626. When the switch prevention signal outputted from the switch assessment part 625 is received in a case in which the previously outputted signal is the HP unit selection signal, the heat source unit selection part 624 outputs the HP unit selection signal to the acquisition part 621 and the drive signal generation part 626.

(3-2-5) Switch Assessment Part 625

The switch assessment part 625 has a timer function for measuring time. The switch assessment part 625 initiates measuring time upon receiving a predetermined signal. Specifically, the switch assessment part 625 initiates measuring time upon receiving a GF unit drive signal (described hereinafter) or an HP unit drive signal (described hereinafter) outputted from the drive signal generation part 626. When the switch assessment part 625 receives the HP unit drive signal after receiving the GF unit drive signal, and also when the switch assessment part 625 receives the GF unit drive signal after receiving the HP unit drive signal, a measured time Ct that had been so far counted is reset and the time measurement is reinitiated.

The switch assessment part 625 assesses whether or not the measured time Ct is equal to or greater than a set time St at each elapse of a predetermined time Pt. If the measured time Ct is less than the set time St as a result of the assessment, the switch assessment part 625 outputs the switch prevention signal to the heat source unit selection part 624. If the measured time Ct is equal to or greater than the set time St as a result of the assessment, the switch assessment part 625 outputs the switch allowing signal to the acquisition part 621. Adequate values are set in the control program for the set time St and the predetermined time Pt, and in the present embodiment, the set time St is set to 30 minutes and the predetermined time Pt is set to five minutes.

(3-2-6) Drive Signal Generation Part 626

The drive signal generation part 626 generates various signals and outputs them to other parts in accordance with the control program.

Specifically, when the drive signal generation part 626 receives the heat load outputted from the computation part 622 after having received the GF unit selection signal outputted from the heat source unit selection part 624, the drive signal generation part 626 generates the GF capacity setting signal. The GF capacity setting signal is a signal commanding the GF unit control part 64 to implement an operating capacity level when the GF unit 30 is operating as the heat source unit. A table defining the correlation between the heat load and the operating capacity level of the GF unit 30 is programmed in advance in the control program, and the GF capacity setting signal is generated according to the control program.

When the drive signal generation part 626 receives the heat load outputted from the computation part 622 after having received the air-cooling operation initiation signal outputted from the acquisition part 621 or the HP unit selection signal outputted from the heat source unit selection part 624, the drive signal generation part 626 generates the HP capacity setting signal. The HP capacity setting signal is a signal commanding the HP unit control part 65 to implement the operating capacity level when the HP unit 40 is operating during the air-cooling operation or operating as the heat source unit during the air-warming operation. A table defining the correlation between the heat load and the operating capacity level of the HP unit 40 is programmed in advance in the control program, and the HP capacity setting signal is generated according to the control program.

The drive signal generation part 626 outputs the GF capacity setting signal or HP capacity setting signal generated during the air-warming operation to the determination part 623. When the drive signal generation part 626 has generated the GF capacity setting signal, the drive signal generation part 626 outputs the generated GF capacity setting signal and a gas furnace unit drive signal (written below as a GF unit drive signal) together to the GF unit control part 64, and outputs a heat pump unit stop signal (written below as an HP unit stop signal) to the HP unit control part 65. When the drive signal generation part 626 has generated the HP capacity setting signal, the drive signal generation part 626 outputs the generated HP capacity setting signal and a heat pump unit drive signal (written below as an HP unit drive signal) together to the HP unit control part 65, and outputs a gas furnace unit stop signal (written below as a GF unit stop signal) to the GF unit control part 64. The HP unit drive signal includes information specifying which of the air-cooling operation and the air-warming operation has been indicated.

(3-3) Fan Unit Control Part 63

When power is turned on, the fan unit control part 63 first acquires the control program from the storage part 61. Next, the fan unit control part 63 acquires the user command from the storage part 61 in accordance with the control program. Specifically, when the air-cooling operation initiation command, the air-warming operation initiation command, or the operation stop command is stored in the storage part 61, the fan unit control part 63 acquires the command in real time.

When the fan unit control part 63 has acquired the air-cooling operation initiation command or the air-warming operation initiation command, the fan unit control part 63 sends a signal to the first power supply part 211 so as to initiate supplying power to the first fan motor M21. The first fan motor M21 thereby initiates being driven and the fan unit 20 goes into an operating state. When the fan unit control part 63 has acquired the operation stop command, the fan unit control part 63 sends a signal to the first power supply part 211 so as to stop the power supply to the first fan motor M21. The first fan motor M21 thereby stops being driven and the fan unit 20 is stopped.

(3-4) GF Unit Control Part 64

When power is turned on, the GF unit control part 64 acquires the control program from the storage part 61. The GF unit control part 64 generates a signal according to the control program and sends the generated signal to other parts.

Specifically, upon receiving the GF unit drive signal outputted from the drive signal generation part 626, the GF unit control part 64 performs GF unit drive control for operating the GF unit 30 as the heat source unit. The GF unit control part 64 first sends a signal to the second power supply part 352 so as to initiate supplying power to the second fan motor 351 in GF unit drive control. Also, the GF unit control part 64 sends a signal to the gas valve opening/closing part 361 so as to cause the gas valve 36 to open. The GF unit control part 64 then sends a signal to the plug power supply part 372 so as to cause electric discharge in the plug 371 for a predetermined time. The second fan motor 351 thereby initiates being driven, putting the fan 35 into the driven state, combustion gas is generated in the combustion part 37, and the GF unit 30 goes into the driven state. When the GF unit drive signal is received while the GF unit 30 is already operating as the heat source unit, the GF unit control part 64 does not do any action according to the GF unit drive signal.

When the GF unit control part 64 receives the GF capacity setting signal outputted from the drive signal generation part 626, the GF unit control part 64 performs GF unit intermittent drive control for intermittently operating the GF unit 30. Specifically, in the GF unit intermittent drive control, the GF unit control part 64 sends a signal to the gas valve opening/closing part 361 at a predetermined timing so as to the gas valve 36 to close. The GF unit control part then sends a signal to the gas valve opening/closing part 361 at a predetermined timing so as to cause the gas valve 36 to open, and then sends a signal to the plug power supply part 372 so as to cause electric discharge in the plug 371. The GF unit 30 thereby goes into an intermittently driven state of repeatedly starting and stopping at predetermined timings, and the GF unit 30 is driven at an operating capacity designated by the GF capacity setting signal.

Programmed into the control program is a table defining the correlation between the operating capacity level designated in the GF capacity setting signal and the timing at which the gas valve 36 is opened and closed in the GF unit intermittent drive control. The GF unit control part 64 performs the GF unit intermittent drive control on the basis of this table. When the GF unit 30 receives the GF capacity setting signal while in the intermittently driven state, the GF unit control part 64 refers again to the table and updates the GF unit intermittent drive control.

When the GF unit control part 64 receives the GF unit stop signal outputted from the drive signal generation part 626, the GF unit control part 64 performs GF unit stop control for stopping the operating of the GF unit 30 as the heat source unit. Specifically, in the GF unit stop control, the GF unit control part 64 first sends a signal to the gas valve opening/closing part 361 so as to cause the gas valve 36 to close. The GF unit control part 64 then sends a signal to the second power supply part 352 so as to stop the power supply to the second fan motor 351. The second fan motor 351 thereby stops being driven, putting the fan 35 into a stopped state, the generation of combustion gas in the combustion part 37 is stopped, and the GF unit 30 stops operating as the heat source unit. When the GF unit stop signal is received while the GF unit 30 has stopped operating as the heat source unit, the GF unit control part 64 does not do any action according to the GF unit stop signal.

(3-5) HP Unit Control Part 65

When power is turned on, the HP unit control part 65 acquires the control program from the storage part 61. The HP unit control part 65 generates a signal according to the control program and sends the signal to other parts.

Specifically, when the HP unit control part 65 receives the HP capacity setting signal and the HP unit drive signal outputted from the drive signal generation part 626, the HP unit control part 65 performs HP unit capacity control and HP unit drive control for operating the HP unit 40.

In the HP unit drive control, the HP unit control part 65 switches the flow path of the four-way switching valve FV in accordance with the air-cooling operation and the air-warming operation. The HP unit control part 65 also sends a signal to the outdoor unit control part 51 so as to initiate supplying power to the outdoor fan power supply part so that the outdoor fan motor M46 initiates being driven. The HP unit control part 65 also sends a signal to the outdoor unit control part 51 so as to cause the expansion valve 49 to open at an appropriate opening degree.

In the HP unit capacity control, the HP unit control part 65 decides the rotational speed of the compressor motor M45 on the basis of the operating capacity level of the HP unit included in the HP capacity setting signal. The HP unit control part 65 then sends a signal to the outdoor unit control part 51 so as to supply power to the inverter so that the compressor motor M45 is driven at the decided rotational speed. Programmed into the control program is a table defining the correlation between the operating capacity level designated in the HP capacity setting signal and the rotational speed of the compressor motor M45. The HP unit control part 65 performs the HP unit capacity control on the basis of this table.

Through the HP unit drive control and the HP unit capacity control described above, a vapor-compression refrigeration cycle is taken place in the HP unit 40, and the HP unit 40 operates at the designated operating capacity. When the HP unit 40 is already operating and the HP unit drive signal is received during the air-warming operation, the HP unit control part 65 does not do any action according to the HP unit drive signal. When the HP capacity setting signal is received while the HP unit 40 is in the driven state, the HP unit control part 65 refers again to the table, updates the rotational speed of the compressor motor M45, and sends a signal to the outdoor unit control part 51 so as to supply power to the inverter so that the compressor motor M45 is driven at the updated rotational speed.

When the HP unit control part 65 receives the HP unit stop signal outputted from the drive signal generation part 626, the HP unit control part 65 performs HP unit stop control for stopping the operating of the HP unit 40. Specifically, in the HP unit stop control, the HP unit control part 65 sends a signal to the outdoor unit control part 51 so as to stop the supply of power to the compressor motor M45 and the outdoor fan motor M46. Also, the HP unit control part 65 sends a signal to the outdoor unit control part 51 so as to open the expansion valve 49. The HP unit 40 thereby stops operating. When the HP unit 40 has stopped operating and the HP unit stop signal is received, the HP unit control part 65 does not do any action according to the HP unit stop signal.

(3-6) Display Control Part 66

When power is turned on, the display control part 66 acquires the control program from the storage part 61. The display control part 66 acquires the user command, the room temperature Ti, the set temperature Tp, and other information from the storage part 61 in accordance with the control program. Specifically, when the air-cooling operation initiation command, the air-warming operation initiation command or the operation stop command, the room temperature Ti, and the set temperature Tp are stored in the storage part 61, the display control part 66 acquires these information in real time.

When the display control part 66 acquires the air-cooling operation initiation command or the air-warming operation initiation command, the display control part 66 sends to the display part 55 display data showing information such as whether an operating state is the air-cooling operation or the air-warming operation, the current room temperature Ti, the set temperature Tp, and the like. The display part 55 thereby shows a display informing the user of information such as whether the air conditioning system 10 is in an air-cooling operation state or an air-warming operation state, the current room temperature Ti, the set temperature Tp, and the like. The display control part 66 also sends a signal for stopping the display to the display part 55 when the display control part 66 acquires the operation stop command. The display on the display part 55 thereby ceases.

Figure 7:
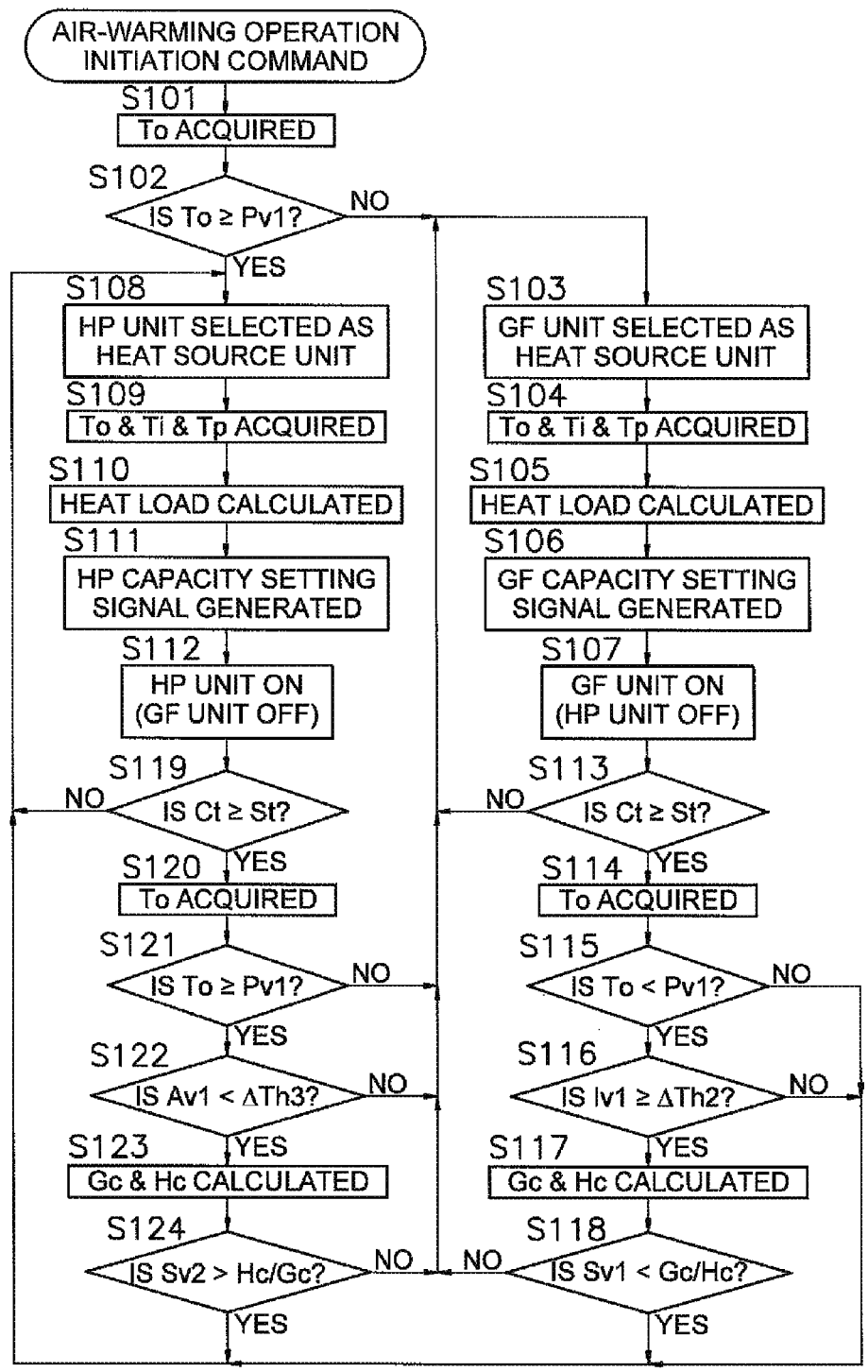
FIG. 7 is a flowchart showing the flow of the process of the switching control part during the air-warming operation.

Flow of the Process of the Switching Control Part 62 During the Air-Warming Operation An example of the flow of the process of the switching control part 62 during the air-warming operation is described below with reference to FIG. 7. FIG. 7 is a flowchart showing the flow of the process of the switching control part 62 during the air-warming operation. The following is an example of the process, and the switching control part 62 may execute a process having a different flow. In the present embodiment, when a power of the air conditioning system 10 is turned on and the air-warming operation initiation command is inputted, the switching control part 62 performs the process having the flow shown in FIG. 7.

In step S101, the acquisition part 621 acquires the outdoor air temperature To from the storage part 61. The acquisition part 621 then outputs the acquired outdoor air temperature To to the determination part 623. The process then advances to step S102.

In step S102, the determination part 623 receives the outdoor air temperature To outputted from the acquisition part 621 and performs the outdoor air temperature determination. When the result of the outdoor air temperature determination is NO (i.e. when the outdoor air temperature To is less than the set value Pv1), the determination part 623 outputs the low-outdoor-air-temperature determination signal to the heat source unit selection part 624. The process then advances to step S103. When the determination is YES (i.e. when the outdoor air temperature To is equal to or greater than the set value Pv1), the determination part 623 outputs the high-outdoor-air-temperature determination signal to the heat source unit selection part 624. The process then advances to step S108.

In step S103, the heat source unit selection part 624 receives the low-outdoor-air-temperature determination signal, the large-HP-capacity determination signal, the low-first-cost determination signal, the high-second-cost determination signal, or the switch prevention signal, and outputs the GF unit selection signal to the acquisition part 621 and the drive signal generation part 626. The process then advances to step S104.

In step S104, the acquisition part 621 receives the GF unit selection signal outputted from the heat source unit selection part 624, and acquires the outdoor air temperature To, the room temperature Ti, and the set temperature Tp from the storage part 61. The acquisition part 621 then outputs the acquired outdoor air temperature To, room temperature Ti, and set temperature Tp to the computation part 622. The process then advances to step S105.

In step S105, the computation part 622 receives the outdoor air temperature To, the room temperature Ti, and the set temperature Tp outputted from the acquisition part 621, calculates a heat load, and outputs the heat load to the drive signal generation part 626. The process then advances to step S106.

In step S106, the drive signal generation part 626 receives the GF unit selection signal outputted from the heat source unit selection part 624 and the heat load outputted from the computation part 622, and generates a GF capacity setting signal. The drive signal generation part 626 outputs the generated GF capacity setting signal to the determination part 623. The process then advances to step S107.

In step S107, the drive signal generation part 626 outputs the GF capacity setting signal and the GF unit drive signal to the GF unit control part 64. Also, the drive signal generation part 626 outputs the HP unit stop signal to the HP unit control part 65. The GF unit 30, rather than the HP unit 40, thereby goes into an operating state as the heat source unit or continues the operating state. The process then advances to step S113.

In step S108, the heat source unit selection part 624 receives the high-outdoor-air-temperature determination signal and either the small-GF-capacity determination signal, the high-first-cost determination signal, the low-second-cost determination signal, or the switch prevention signal, and outputs the HP unit selection signal to the acquisition part 621 and the drive signal generation part 626. The process then advances to step S109.

In step S109, the acquisition part 621 receives the HP unit selection signal outputted from the heat source unit selection part 624, and acquires the outdoor air temperature To, the room temperature Ti, and the set temperature Tp from the storage part 61. The acquisition part 621 then outputs the acquired outdoor air temperature To, room temperature Ti, and set temperature Tp to the computation part 622. The process then advances to step S110.

In step S110, the computation part 622 receives the outdoor air temperature To, the room temperature Ti, and the set temperature Tp outputted from the acquisition part 621, calculates a heat load, and outputs the heat load to the drive signal generation part 626. The process then advances to step S111.

In step S111, the drive signal generation part 626 receives the HP unit selection signal outputted from the heat source unit selection part 624 and the heat load outputted from the computation part 622, and generates the HP capacity setting signal. The drive signal generation part 626 outputs the generated HP capacity setting signal to the determination part 623. The process then advances to step S112.

In step S112, the drive signal generation part 626 outputs the HP capacity setting signal and the HP unit drive signal to the HP unit control part 65. Also, the drive signal generation part 626 outputs the GF unit stop signal to the GF unit control part 64. The HP unit 40, rather than the GF unit 30, thereby goes into an operating state as the heat source unit or continues the operating state. The process then advances to step S119.

In step S113, the switch assessment part 625 assesses whether or not the measured time Ct is equal to or greater than the set time St. When the assessment is NO (i.e. when the measured time Ct is less than the set time St), the switch assessment part 625 outputs the switch prevention signal to the heat source unit selection part 624. The process then returns to step S103. When the assessment is YES (i.e. when the measured time Ct is equal to or greater than the set time St), the switch assessment part 625 outputs the switch allowing signal to the acquisition part 621. The process then advances to step S114.

In step S114, the acquisition part 621 receives the switch allowing signal outputted from the switch assessment part 625 and acquires the outdoor air temperature To from the storage part 61. The acquisition part 621 then outputs the acquired outdoor air temperature To to the determination part 623. The process then advances to step S115.

In step S115, the outdoor air temperature determination is performed. When the result of the outdoor air temperature determination is that the outdoor air temperature To is equal to or greater than the set value Pv1 (when the determination is NO), the determination part 623 outputs the high-outdoor-air-temperature determination signal to the heat source unit selection part 624. The process then returns to step S108. When the outdoor air temperature To is less than the set value Pv1 (when the determination is YES), the determination part 623 outputs the low-outdoor-air-temperature determination signal to the heat source unit selection part 624. The process then advances to step S116.

In step S116, the determination part 623 receives the GF capacity setting signal outputted from the drive signal generation part 626 and performs the GF capacity determination. When the result of the GF capacity determination is NO (i.e. when the integrated value Iv1 of the duty ratio at which the GF unit 30 operates as the heat source unit during the predetermined time period P1 is less than the second threshold $\Delta Th2$), the determination part 623 outputs the small-GF-capacity determination signal to the heat source unit selection part 624. The process then returns to step S108. When the result of the GF capacity determination is YES (i.e. when the integrated value Iv1 of the duty ratio at which the GF unit 30 operates as the heat source unit during the predetermined time period P1 is equal to or greater than the second threshold $\Delta Th2$), the process advances to step S117. Until the number of the GF capacity setting signals retained in the determination part 623 reaches a certain number, the process advances to step S117 without the determination part 623 performing the GF capacity determination in step S116.

In step S117, the computation part 622 calculates the first cost Gc and the second cost Hc and outputs them to the determination part 623. The process then advances to step S118.

In step S118, the determination part 623 receives the first cost Gc and the second cost Hc outputted from the computation part 622 and performs the cost-saving determination. When the determination is NO in the cost-saving determination (i.e. when the first cost Gc is not greater than the second cost Hc by a percentage exceeding the first standard value Sv1), the determination part 623 outputs the low-first-cost determination signal to the heat source unit selection part 624. The process then returns to step S103. When the determination is YES (i.e. when the first cost Gc is greater than the second cost Hc by a percentage exceeding the first standard value Sv1), the determination part 623 outputs the high-first-cost determination signal to the heat source unit selection part 624. The process then returns to step S108.

In step S119, the switch assessment part 625 assesses whether or not the measured time Ct is equal to or greater than the set time St. When the assessment is NO (i.e. when the measured time Ct is less than the set time St), the switch assessment part 625 outputs the switch prevention signal to the heat source unit selection part 624. The process then returns to step S108. When the assessment is YES (i.e. when the measured time Ct is equal to or greater than the set time St), the switch assessment part 625 outputs the switch allowing signal to the acquisition part 621. The process then advances to step S120.

In step S120, the acquisition part 621 receives the switch allowing signal outputted from the switch assessment part 625 and acquires the outdoor air temperature To from the storage part 61. The acquisition part 621 then outputs the acquired outdoor air temperature To to the determination part 623. The process then advances to step S121.

In step S121, the outdoor air temperature determination is performed similar to step S102. When the determination is NO, the determination part 623 outputs the low-outdoor-air-temperature determination signal to the heat source unit selection part 624. The process then returns to step S103. When the determination is YES, the determination part 623 outputs the high-outdoor-air-temperature determination signal to the heat source unit selection part 624. The process then advances to step S122.

In step S122, the determination part 623 receives the HP capacity setting signal outputted from the drive signal generation part 626 and performs the HP capacity determination. When the result of the HP capacity determination is NO (i.e. when the average value Av1 of the partial load factor during the predetermined time period P2 is equal to or greater than the third threshold $\Delta Th3$), the determination part 623 outputs the large-HP-capacity determination signal indicating that to the heat source unit selection part 624. The process then returns to step S103. When the result of the HP capacity determination is YES (i.e. when the average value Av1 of the partial load factor during the predetermined time period P2 is less than the third threshold $\Delta Th3$), the process advances to step S123. Until the number of the HP capacity setting signals retained in the determination part 623 reaches a certain number, the process advances to step S123 without the determination part 623 performing the HP capacity determination in step S122.

In step S123, the computation part 622 calculates the first cost Gc and the second cost Hc and outputs them to the determination part 623. The process then advances to step S124.

In step S124, the determination part 623 receives the first cost Gc and the second cost Hc outputted from the computation part 622 and performs the cost-saving determination. When the determination is NO in the cost-saving determination (i.e. when the second cost Hc is greater than the first cost Gc by a percentage exceeding the second standard value Sv2), the determination part 623 outputs the high-second-cost determination signal to the heat source unit selection part 624. The process then returns to step S103. When the determination is YES (i.e. when the second cost Hc is not greater than the first cost Gc by a percentage exceeding the second standard value Sv2), the determination part 623 outputs the low-second-cost determination signal to the heat source unit selection part 624. The process then returns to step S108.

Activated States of Components

Figure 8:
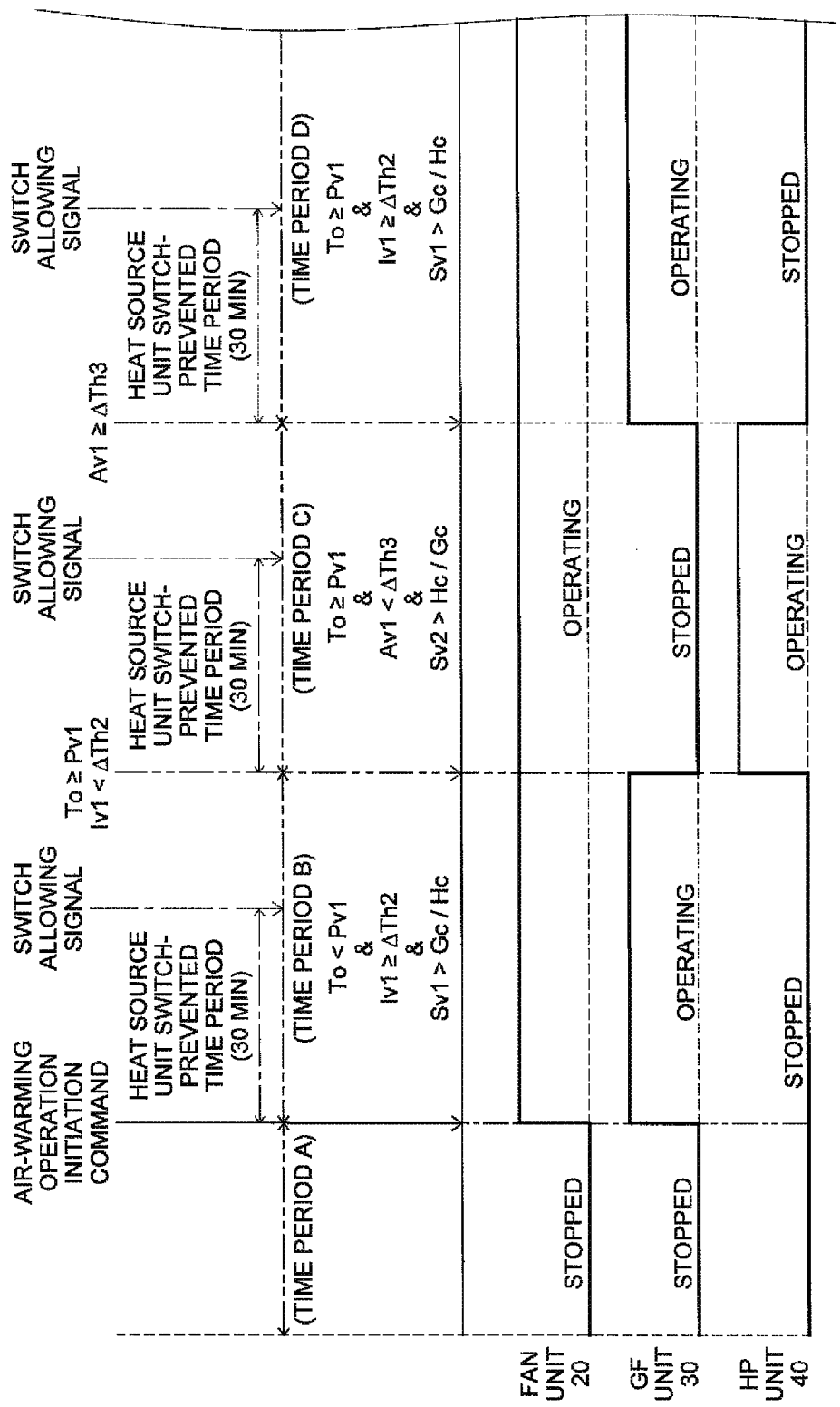
FIG. 8 is a timing chart showing an example of the changes in the states of each section when an air-warming operation initiation command is inputted.
Figure 9:
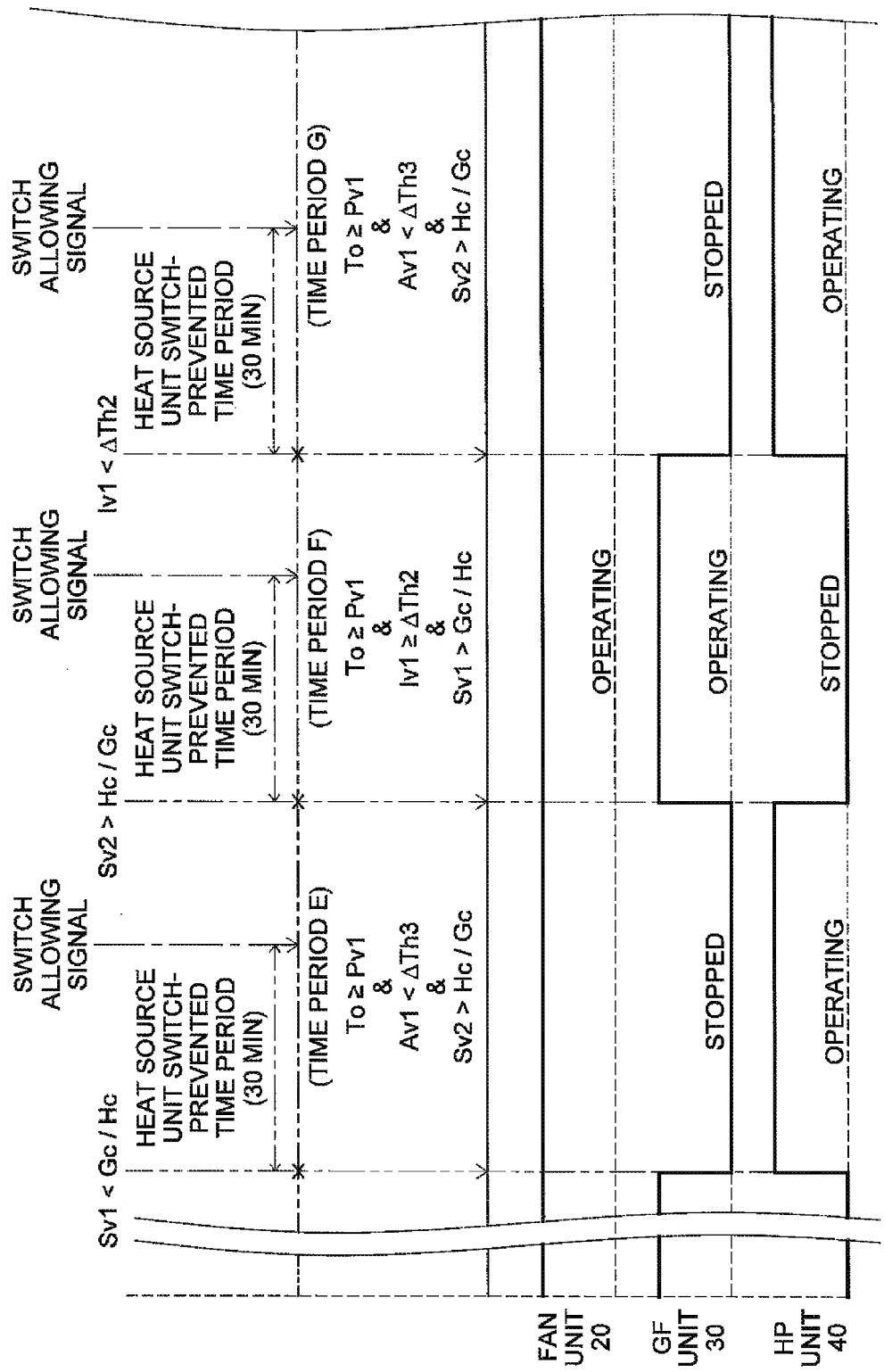
FIG. 9 is a timing chart showing an example of the changes in the states of each section when an air-warming operation initiation command is inputted.
Figure 10:
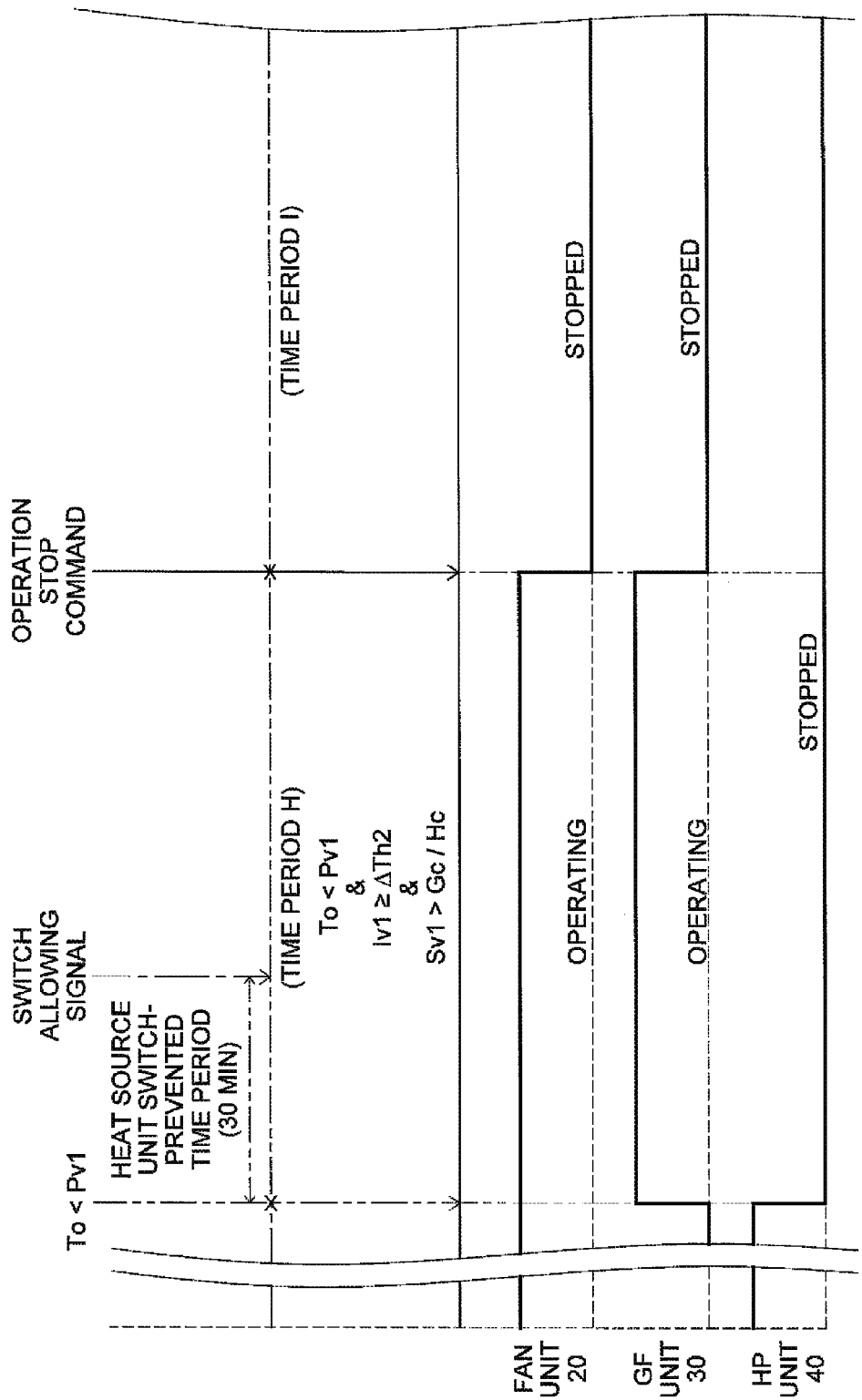
FIG. 10 is a timing chart showing an example of the changes in the states of each section when an air-warming operation initiation command is inputted.

An example of the activated states of the components of the air conditioning system 10 is described below with reference to FIGS. 8 to 10. FIGS. 8, 9, and 10 are timing charts showing an example of the changes in the states of each section when the air-warming operation initiation command is inputted.

In the time period A in FIG. 8, the air conditioning system 10 is in the stopped state. In other words, the fan unit 20, the GF unit 30, and the HP unit 40 have stopped operating.

In the time period B, the fan unit 20 operates in accordance with the input of the air-warming operation initiation command. The GF unit 30 also operates as the heat source unit in accordance with the outdoor air temperature To being less than the set value Pv1. A time period from this time until the switch allowing signal is outputted by the switch assessment part 625 (i.e. until 30 minutes have elapsed) is the heat source unit switch-prevented time period during which switching of the heat source unit is prevented. The HP unit 40 continues to not operate.

In the time period C, the GF unit 30 stops operating and the HP unit 40 operates as the heat source unit in accordance with the outdoor air temperature To being equal to or greater than the set value Pv1. The fan unit 20 remains operating. A time period from this time until the switch allowing signal is outputted by the switch assessment part 625 (i.e. until 30 minutes have elapsed) is the heat source unit switch-prevented time period during which switching of the heat source unit is prevented.

In the time period D, the HP unit 40 stops operating and the GF unit 30 operates as the heat source unit in accordance with the average value Av1 of the partial load factor being equal to or greater than the $\Delta Th3$. The fan unit 20 remains operating. A time period from this time until the switch allowing signal is outputted by the switch assessment part 625 (i.e. until 30 minutes have elapsed) is the heat source unit switch-prevented time period during which switching of the heat source unit is prevented.

In the time period E in FIG. 9, the GF unit 30 stops operating and the HP unit 40 operates as the heat source unit, in accordance with the first cost Gc being higher than the second cost Hc by a percentage exceeding the first standard value Sv1. The fan unit 20 remains operating. A time period from this time until the switch allowing signal is outputted by the switch assessment part 625 (i.e. until 30 minutes have elapsed) is the heat source unit switch-prevented time period during which switching of the heat source unit is prevented.

In the time period F, the HP unit 40 stops operating and the GF unit 30 operates as the heat source unit, in accordance with the second cost Hc being higher than the first cost Gc by a percentage exceeding the second standard value Sv2. The fan unit 20 remains operating. A time period from this time until the switch allowing signal is outputted by the switch assessment part 625 (i.e. until 30 minutes have elapsed) is the heat source unit switch-prevented time period during which switching of the heat source unit is prevented.

In the time period G, the GF unit 30 stops operating and the HP unit 40 operates as the heat source unit, in accordance with the integrated value Iv1 of the duty ratio being less than the $\Delta Th2$. The fan unit 20 remains operating. A time period from this time until the switch allowing signal is outputted by the switch assessment part 625 (i.e. until 30 minutes have elapsed) is the heat source unit switch-prevented time period during which switching of the heat source unit is prevented.

In the time period H in FIG. 10, the HP unit 40 stops operating and the GF unit 30 operates as the heat source unit, in accordance with the outdoor air temperature To being less than the set value Pv1. The fan unit 20 remains operating. A time period from this time until the switch allowing signal is outputted by the switch assessment part 625 (i.e. until 30 minutes have elapsed) is the heat source unit switch-prevented time period during which switching of the heat source unit is prevented.

In the time period I, the air conditioning system 10 goes into the stopped state in accordance with the input of the operation stop command. In other words, the fan unit 20, the GF unit 30, and the HP unit 40 stop operating.

Functions of Air Conditioning System 10

An environmental load restraining function and a cost-saving function of the air conditioning system 10 are described below in order.

(6-1) Environmental Load Restraining Function

In the air conditioning system 10, the outdoor air temperature determination is performed by the controller 60 during the air-warming operation. Whichever of the GF unit 30 and the HP unit 40 that has the lower environmental load is thereby selected as the heat source unit in accordance with the outdoor air temperature To. The environmental load is thereby restrained.

The air conditioning system 10 is configured so that the GF capacity determination is performed by the controller 60 during the air-warming operation. When the GF unit 30 is operating as the heat source unit and the controller 60 assesses that the integrated value Iv1 of the duty ratio at which the GF unit 30 is operating during the predetermined time period P has fallen below the second threshold ΔTh2, the number of times the GF unit 30 starts and stops during the predetermined time period P1 is estimated to have exceeded the first threshold ΔTh1, which is equivalent to a number of times that increases the environmental load. When the air conditioning system 10 has lapsed into such a state, the operating heat source unit is switched from the GF unit 30 to the HP unit 40 due to that the environmental load increase is predicted. Specifically, the heat source unit is switched from the GF unit 30 to the HP unit 40 when the controller 60 assesses that the number of times the GF unit 30 starts and stops during the predetermined time period P1 is estimated to be equal to or greater than the first threshold ΔTh1. The environmental load is thereby restrained.

The air conditioning system 10 is also configured so that the HP capacity determination is performed by the controller 60 during the air-warming operation. When the HP unit 40 is operating as the heat source unit during the air-warming operation, the environmental load increase is predicted at the time when the average value Av1 of the partial load factor during the predetermined time period P2 becomes equal to or greater than the third threshold ΔTh3. When the air conditioning system 10 has lapsed into such a state, the operating heat source unit is switched from the HP unit 40 to the GF unit 30. In other words, when the HP unit 40 is operating as the heat source unit, the air conditioning system 10 switches the operating heat source unit from the HP unit 40 to the GF unit 30 at the time when the partial load factor in during the predetermined time becomes equal to or greater than the third threshold ΔTh3, restraining the environmental load.

The controller 60 performs the GF capacity determination on the basis of the average value of the operating capacity level included in each GF capacity setting signal outputted in the predetermined time period P1. The controller 60 also performs the HP capacity determination on the basis of the average value of the operating capacity level included in each HP capacity setting signal outputted in the predetermined time period P2. In other words, the controller 60 generates a capacity command for variably adjusting the operating capacity of the unit operating as the heat source unit, and switches the heat source unit from either the GF unit 30 or the HP unit 40 to the other when the operating capacity level designated in the capacity command continues to be in a predetermined numerical range for a predetermined amount of time.

The air conditioning system 10 is designed so that during the air-warming operation, a predetermined heat source unit switch-prevented time period is set, whereby the heat source unit is not switched during this time period. Specifically, the heat source unit switch-prevented time period is the time period from initiation of the air-warming operation of the air conditioning system 10 until the set time St (30 minutes) elapses, and also from a switch of the heat source unit until the set time St (30 minutes) elapses. The air conditioning system is thereby configured so that frequent switching of the heat source unit in a short amount of time is suppressed, and the environmental load is not likely to increase. If the heat source unit were to be frequently switched in a short amount of time, the amenity would be expected to suffer, yet the air conditioning system is designed so that the amenity is not likely to decrease.

(6-2) Cost-Saving Function

The air conditioning system 10 is configured so that the first cost Gc, which is the cost of operating the GF unit 30 as the heat source unit, and the second cost Hc, which is the cost of operating the HP unit 40 as the heat source unit, are calculated as appropriate by the controller 60 during the air-warming operation, and the cost-saving determination is performed to compare the two.

Specifically, when the GF unit 30 is operating and the environmental load is unlikely to increase, the controller 60 switches the operating heat source unit to the HP unit 40 when the first cost Gc is higher than the second cost Hc by a percentage exceeding the first standard value Sv1. When the HP unit 40 is operating and the environmental load is unlikely to increase, the controller 60 switches the operating heat source unit to the GF unit 30 when the second cost Hc is higher than the first cost Gc by a percentage exceeding the second standard value Sv2.

When the environmental load is unlikely to increase due to a predetermined condition being fulfilled while the air conditioning system 10 is operating, whichever of the GF unit 30 and the HP unit 40 has the lower cost is thereby selected as the heat source unit. Consequently, the cost associated with operating the air conditioning system 10 is easily restrained.

In FIG. 7, steps S117 and S118 are processes that occur after steps S113, S115, and S116 have been executed. Steps S123 and S124 are processes that occur after steps S119, S121, and S122 have been executed. Specifically, the cost-saving function is carried out on the premise that the environmental load restraining function is in effect. In other words, the environmental load restraining function is prioritized over the cost-saving function in the air conditioning system 10.

Characteristics (7-1)

In the above embodiment, the controller 60 generates the GF capacity setting signal or the HP capacity setting signal which is a capacity command for variably adjusting the operating capacity of the heat source unit during the air-warming operation. Also, when the operating capacity level designated in the capacity command continues to be within a predetermined numerical range for a predetermined amount of time, the controller switches the heat source unit from either the GF unit 30 or the HP unit 40 to the other. Specifically, the configuration is designed such that in the control logic whereby the heat source unit is switched by the controller 60, the operating capacity level included in the capacity command is employed as a parameter. When the environmental load increase is predicted on the basis of this parameter, the heat source unit is switched from either the GF unit 30 or the HP unit 40 to the other. Whichever of the GF unit 30 and the HP unit 40 is less likely to increase the environmental load is thereby operated as the heat source unit during the air-warming operation, in accordance with the circumstances. Consequently, the environmental load is restrained.

(7-2)

In the above embodiment, when the GF unit 30 is operating as the heat source unit during the air-warming operation, the controller 60 switches the operating heat source unit to the HP unit 40 when the controller 60 assesses that the number of times the GF unit 30 starts and stops during the predetermined time period P1 is estimated to be equal to or greater than the first threshold $\Delta Th1$. When the GF unit 30 is operating as the heat source unit and the number of times the GF unit 30 starts and stops during the predetermined time period P1 exceeds a predetermined number of times, the environmental load is predicted to increase along with the decrease in the heat load process capability. However, the above embodiment is configured so that when the air conditioning system falls into such a state, the operating heat source unit is switched to the HP unit 40. Consequently, the environmental load is restrained with precision.

(7-3)

In the above embodiment, when the GF unit 30 is operating as the heat source unit during the air-warming operation, the controller 60 assesses that the number of times the GF unit 30 starts and stops during the predetermined time period P1 is estimated to be equal to or greater than the first threshold $\Delta Th1$ when the integrated value Iv1 of the duty ratio at which the GF unit 30 is operating during the predetermined time period P1 becomes less than the second threshold $\Delta Th2$, and the controller switches the heat source unit to the HP unit 40. Consequently, the environmental load is restrained with precision.

(7-4)

In the above embodiment, when the HP unit 40 is operating as the heat source unit during the air-warming operation, the controller 60 switches the operating heat source unit to the GF unit 30 when the average value Av1 of the partial load factor during the predetermined time period P2 becomes equal to or greater than the third threshold $\Delta Th3$. Specifically, when the partial load factor during the predetermined time is equal to or greater than a predetermined value while the HP unit 40 is operating as the heat source unit, the environmental load is predicted to increase along with the decrease in the heat load process capability. However, in the above embodiment, the operating heat source unit is switched to the GF unit 30 at such a time. Consequently, the environmental load is restrained with precision.

(7-5)

In the above embodiment, when the environmental load is unlikely to increase while the GF unit 30 is operating as the heat source unit during the air-warming operation, if the first cost Gc is higher than the second cost Hc by a percentage exceeding the first standard value Sv1, the controller 60 switches the operating heat source unit to the HP unit 40. When the environmental load is unlikely to increase while the HP unit 40 is operating as the heat source unit during the air-warming operation, if the second cost Hc is higher than the first cost Gc by a percentage exceeding the second standard value Sv2, the controller 60 switches the operating heat source unit to the GF unit 30. Whichever of the GF unit 30 and the HP unit 40 has the lower cost is thereby operated as the heat source unit under circumstances in which the environmental load is unlikely to increase. Consequently, the cost associated with operation is easily restrained.

(7-6)

In the above embodiment, the heat source unit switch-prevented time period during which switching of the operating heat source unit is prevented is in effect after the initiation of the air-warming operation (startup) of the air conditioning system 10 until the set time St (30 minutes) elapses, and also after the heat source unit is switched until the set time St (30 minutes) elapses. Specifically, if the heat source unit were to be frequently switched in a short amount of time, it is expected that the environmental load would increase and the amenity would decrease. However, the above embodiment is configured such that providing the heat source unit switch-prevented time period causes switching of the heat source unit to be suppressed until the predetermined time elapses after the initiation of the air-warming operation of the air conditioning system 10 and after a switching of the heat source unit. Therefore, the heat source unit is not likely to be frequently switched in a short amount of time. Consequently, both the increase of the environmental load and the decrease of the amenity are restrained.

Modifications (8-1) Modification A

The air conditioning system 10 was configured so as to be capable of performing the air-cooling operation in addition to the air-warming operation in the above embodiment. But the air conditioning system 10 may be configured as an air conditioning system capable of executing only the air-warming operation. In this case, the four-way switching valve FV is omitted in the HP unit 40, and control relating to the air-cooling operation is omitted.

(8-2) Modification B

The outdoor air temperature sensor 50 was connected to the outdoor unit control part 51 via a cable (not shown) in the above embodiment, but may be directly connected to the controller 60. In this case, either the outdoor air temperature sensor 50 performs A/D conversion and sends a digital signal to the controller 60, or the controller 60 receives an analog signal and performs A/D conversion.

(8-3) Modification C

The controller 60 was connected to the other components via the cables 601 in the above embodiment, but any or all of the outdoor unit control part 51, the first power supply part 211, the second power supply part 352, the gas valve opening/closing part 361, and the plug power supply part 372 may be placed inside the controller 60.

(8-4) Modification D

The controller 60 was included in the electrical component unit 52 in the above embodiment, but is not limited as such. For example, the controller 60 may be placed inside the electric component box 14 or placed inside the outdoor unit 43. Any or all of the storage part 61, the switching control part 62, the fan unit control part 63, the GF unit control part 64, the HP unit control part 65, and the display control part 66 included in the controller 60 may be placed in a remote location or the like connected to a network such as a LAN or a WAN. Any or all of the acquisition part 621, the computation part 622, the determination part 623, the heat source unit selection part 624, the switch assessment part 625, and the drive signal generation part 626 included in the switching control part 62 may also be placed in a remote location or the like connected to a network such as a LAN or a WAN.

(8-5) Modification E

In the above embodiment, the switching control part 62, the fan unit control part 63, the GF unit control part 64, the HP unit control part 65, and the display control part 66 acquired control programs from the storage part 61. However, such an arrangement is not provided by way of limitation; the fan unit control part 63, the GF unit control part 64, the HP unit control part 65, and the display control part 66 may, for example, hold storage areas and the control programs may be stored in these storage areas.

(8-6) Modification F

In the above embodiment, the controller 60 performed control for switching the unit operating as the heat source unit when a predetermined condition was fulfilled or when a predetermined condition ceased to be fulfilled during the air-warming operation (refer to steps S115, S116, S118, S121, S122, and S124 in FIG. 7). However, such an arrangement is not provided by way of limitation; a predetermined delay time may be provided in this control. For example, when the GF unit 30 is operating as the heat source unit, the controller 60 may switch the unit operating as the heat source unit after a predetermined time elapses from the time when the integrated value Iv1 of the duty ratio at which the GF unit 30 operates during the predetermined time period P1 becomes less than the second threshold $\Delta Th2$. When the HP unit 40 is operating as the heat source unit during the air-warming operation, the controller 60 may switch the unit operating as the heat source unit after a predetermined time elapses from the time when the average value Av1 of the partial load factor during the predetermined time period P2 becomes equal to or greater than the third threshold $\Delta Th3$. The heat source unit can thereby be switched when the condition is reliably fulfilled. The delay time is set to 30 seconds or one minute, for example, but is not limited as such and may be set to a numerical value adequate for the environment where the system is installed.

(8-7) Modification G

In the above embodiment, the controller 60 operates the GF unit 30 as the heat source unit when the outdoor air temperature To is less than the set value Pv1 during the air-warming operation, and the set value Pv1 is set to 0 (° C.). However, the set value Pv1 is not limited to 0 and may be changed as appropriate. Specifically, as long as the condition is fulfilled that operating the GF unit 30 as the heat source unit has a lower environmental load than operating the HP unit 40 as the heat source unit when the outdoor air temperature To is below the set value Pv1, the set value Pv1 may be any value, e.g. −5 (° C.) or 5 (° C.).

(8-8) Modification H

In the above embodiment, the controller 60 operates the GF unit 30 as the heat source unit when the outdoor air temperature To is less than the set value Pv1 at the initiation of the air-warming operation and also during the air-warming operation of the air conditioning system 10. However, the control wherein the GF unit 30 is operated as the heat source unit when the outdoor air temperature To is less than the set value Pv1 during the air-warming operation can be omitted. In this case, steps S115 and S121 are omitted in the flowchart of FIG. 7.

(8-9) Modification I

In the above embodiment, when, during the air-warming operation, the controller 60 assesses that the integrated value Iv1 of the duty ratio at which the GF unit 30 operates during the predetermined time period P1 is less than the second threshold $\Delta Th2$, the controller estimates that the number of times the GF unit 30 starts and stops during the predetermined time period P1 is equal to or greater than the first threshold $\Delta Th1$, and executes control for operating the HP unit 40 as the heat source unit in place of the GF unit 30.

However, the method of estimating that the number of times the GF unit 30 starts and stops during the predetermined time period P1 is equal to or greater than the first threshold $\Delta Th1$ is not provided by way of limitation; it can be changed as appropriate. For example, a signal is sent from the gas valve opening/closing part 361 to the switching control part 62, and the determination part 623 is given a timer function. When the GF unit 30 is operating as the heat source unit, the determination part 623 measures the number of times the gas valve 36 opens and closes during the predetermined time period P1, and determines whether or not this number of times is equal to or greater than the first threshold $\Delta Th1$. In this determination, when it is determined that the number of times the gas valve 36 opens and closes during the predetermined time period P1 is equal to or greater than the first threshold $\Delta Th1$, the number of times the GF unit 30 starts and stops may be estimated to be equal to or greater than the first threshold $\Delta Th1$, and control may be executed for operating the HP unit 40 as the heat source unit in place of the GF unit 30.

The action or process of "estimating the number of times the GF unit 30 starts and stops to be equal to or greater than the first threshold $\Delta Th1$" may be performed specifically with the action of switching the heat source unit, or the action of switching the heat source unit may be performed when the controller 60 has made a predetermined assessment, without a specific estimating action or process being performed.

(8-10) Modification J

In the above embodiment, when the HP unit 40 is operating as the heat source unit during the air-warming operation, the controller 60 estimates that there is a concern for an increase in environmental load when the average value Av1 of the partial load factor during the predetermined time period P2 becomes equal to or greater than the third threshold $\Delta Th3$, and executes control for operating the GF unit 30 as the heat source unit in place of the HP unit 40. However, this control is not absolutely necessary and can be omitted. In this case, step S122 is omitted in the flowchart of FIG. 7.

(8-11) Modification K

In the above embodiment, the controller 60 calculates the first cost Gc and the second cost Hc as appropriate and compares the two during the air-warming operation, and would executes control for operating whichever of the GF unit 30 and the HP unit 40 has the lower cost as the heat source unit, in accordance with a predetermined condition. However, this control can be omitted. In this case, steps S117, S118, S123, and S124 are omitted in the flowchart of FIG. 7.

(8-12) Modification L

In the above embodiment, the heat source unit switch-prevented time period, during which switching of the operating heat source unit is prevented, is in effect from the initiation of the air-warming operation of the air conditioning system 10 (startup) until the elapse of the set time St (30 minutes), and also from the switching of the heat source unit until the elapse of the set time St (30 minutes). However, the heat source unit switch-prevented time period is not absolutely necessary and can be omitted. In this case, steps S113 and S119 are omitted in the flowchart of FIG. 7.

(8-13) Modification M

In the above embodiment, in the GF capacity determination, the determination part 623 determines whether or not the integrated value Iv1 of the duty ratio at which the GF unit 30 operates as the heat source unit during the predetermined time period P1 is equal to or greater than the second threshold $\Delta Th2$. In this GF capacity determination, the predetermined time period P1 is set to 30 minutes, and the set number Pn1 is set to 30. The second threshold $\Delta Th2$ is set to 30 percent as a value fulfilling the condition that if the integrated value Iv1 of the duty ratio is less than the second threshold $\Delta Th2$, the number of times the GF unit 30 starts and stops during the predetermined time period P1 is estimated to be at least five times, which is the first threshold ΔTh1.

However, the predetermined time period P1, the set number Pn1, the first threshold ΔTh1, and the second threshold ΔTh2 are not limited to these values, and can be changed as appropriate according to the environment in which the system is installed. For example, the set number Pn1 may be set with the predetermined time period P1 as 20 minutes. The set number Pn1 may also be set with the predetermined time period P1 as 60 minutes. The first threshold ΔTh1 may be set to three times or eight times. The second threshold ΔTh2 may be set to 25 percent or 40 percent.

(8-14) Modification N

In the above embodiment, the determination part 623 determines whether or not the average value Av1 of the partial load factor during the predetermined time period P2 is less than the third threshold ΔTh3. In the HP capacity determination, the set number Pn2 is set to 30 with the predetermined time period P2 as 30 minutes. The third threshold ΔTh3 is set to 90 percent. However, the predetermined time period P2, the set number Pn2, and the third threshold ΔTh3 are not limited to these values, and can be changed as appropriate according to the environment in which the system is installed. For example, the set number Pn2 may be set with the predetermined time period P2 as 20 minutes. The set number Pn2 may also be set with the predetermined time period P2 as 60 minutes. The third threshold ΔTh3 may be set to 80 percent or 95 percent, for example.

(8-15) Modification O

In the above embodiment, the determination part 623 determines whether or not the first cost Gc is greater than the second cost Hc by a percentage exceeding the first standard value Sv1, or whether or not the second cost Hc is greater than the first cost Gc by a percentage exceeding the second standard value Sv2. In this cost-saving determination, the first standard value Sv1 and the second standard value Sv2 are set to 1.1. However, the first standard value Sv1 and the second standard value Sv2 are not limited to this value and can be changed as appropriate according to the environment in which the system is installed. For example, the first standard value Sv1 and the second standard value Sv2 may be set to 1.05 or 1.5. The first standard value Sv1 and the second standard value Sv2 also need not be set to the same value, and may be set to different values.

(8-16) Modification P

In the above embodiment, the switch assessment part 625 assesses whether or not the measured time Ct is equal to or greater than the set time St in each predetermined time Pt. The set time St in this assessment would be set to 30 minutes, and the predetermined time Pt is set to 5 minutes. However, the set time St and the predetermined time Pt are not limited to these values; they can be changed as appropriate according to the environment in which the system is installed. For example, the set time St may be set to 20 minutes or 1 hour. The predetermined time Pt may be set to 3 minutes or 10 minutes.

INDUSTRIAL APPLICABILITY

The present invention can be applied to an air conditioning system provided with a gas furnace unit and a heat pump unit.

What is claimed is:

1. An air conditioning system comprising:
    a heat pump unit including a radiator usable with a refrigerant;
    a gas furnace unit including a heating section configured and arranged to heat passing air;
    a blower configured and arranged to generate an air flow that passes through the radiator and the heating section; and
    a controller configured and arranged to control each action of the heat pump unit, the gas furnace unit, and the blower, the controller being configured to
        operate either the heat pump unit or the gas furnace unit as a heat source unit,
        generate a capacity command used to variably adjust operating capacity of the heat source unit, and
        execute switch control in order to switch the heat source unit from either one of the heat pump unit or the gas furnace unit to the other based on an average value of an operating capacity level included in the capacity command outputted for a predetermined time.

2. The air conditioning system according to claim 1, wherein
    the controller is further configured to execute the switch control in order to switch the heat source unit to the heat pump unit when
        the gas furnace unit is operating as the heat source unit, and
        a first state is in effect in which the number of times the gas furnace unit starts and stops during a first time period is equal to or greater than a first threshold.

3. The air conditioning system according to claim 2, wherein
    the first state is a state in which an integrated value of a duty ratio at which the gas furnace unit is in a driving state during a second time period is less than a second threshold.

4. The air conditioning system according to claim 3, wherein
    the controller is further configured to execute the switch control in order to switch the heat source unit to the gas furnace unit when
        the heat pump unit is operating as the heat source unit, and
        a partial load factor during a third time period is equal to or greater than a third threshold.

5. The air conditioning system according to claim 3, wherein
    the controller is further configured to
        calculate a first cost of operating the gas furnace unit as the heat source unit, and a second cost of operating the heat pump unit as the heat source unit;
        execute cost-saving control in order to switch
            the heat source unit to the heat pump unit when the gas furnace unit is operating as the heat source unit and the first cost is higher than the second cost by a percentage exceeding a first standard value, and
            the heat source unit to the gas furnace unit when the heat pump unit is operating as the heat source unit and the second cost is higher than the first cost by a percentage exceeding a second standard value; and
        execute the switch control with priority over the cost-saving control.

6. The air conditioning system according to claim 3, wherein
the controller is further configured to prevent at least one of
execution of the switch control from startup until a fourth time period elapses, and
execution of the switch control until a fifth time period elapses.

7. The air conditioning system according to claim 2, wherein
the controller is further configured to execute the switch control in order to switch the heat source unit to the gas furnace unit when
the heat pump unit is operating as the heat source unit, and
a partial load factor during a third time period is equal to or greater than a third threshold.

8. The air conditioning system according to claim 2, wherein
the controller is further configured to
calculate a first cost of operating the gas furnace unit as the heat source unit, and a second cost of operating the heat pump unit as the heat source unit;
execute cost-saving control in order to switch
the heat source unit to the heat pump unit when the gas furnace unit is operating as the heat source unit and the first cost is higher than the second cost by a percentage exceeding a first standard value, and
the heat source unit to the gas furnace unit when the heat pump unit is operating as the heat source unit and the second cost is higher than the first cost by a percentage exceeding a second standard value; and
execute the switch control with priority over the cost-saving control.

9. The air conditioning system according to claim 2, wherein
the controller is further configured to prevent at least one of
execution of the switch control from startup until a fourth time period elapses, and
execution of the switch control until a fifth time period elapses.

10. The air conditioning system according to claim 1, wherein
the controller is further configured to execute the switch control in order to switch the heat source unit to the gas furnace unit when
the heat pump unit is operating as the heat source unit, and
a partial load factor during a third time period is equal to or greater than a third threshold.

11. The air conditioning system according to claim 10, wherein
the controller is further configured to
calculate a first cost of operating the gas furnace unit as the heat source unit and a second cost of operating the heat pump unit as the heat source unit;
execute cost-saving control in order to switch
the heat source unit to the heat pump unit when the gas furnace unit is operating as the heat source unit and the first cost is higher than the second cost by a percentage exceeding a first standard value, and
the heat source unit to the gas furnace unit when the heat pump unit is operating as the heat source unit and the second cost is higher than the first cost by a percentage exceeding a second standard value; and
execute the switch control with priority over the cost-saving control.

12. The air conditioning system according to claim 10, wherein
the controller is further configured to prevent at least one of
execution of the switch control from startup until a fourth time period elapses, and
execution of the switch control until a fifth time period elapses.

13. The air conditioning system according to claim 1, wherein
the controller is further configured to
calculate a first cost of operating the gas furnace unit as the heat source unit, and a second cost of operating the heat pump unit as the heat source unit;
execute cost-saving control in order to switch
the heat source unit to the heat pump unit when the gas furnace unit is operating as the heat source unit and the first cost is higher than the second cost by a percentage exceeding a first standard value, and
the heat source unit to the gas furnace unit when the heat pump unit is operating as the heat source unit and the second cost is higher than the first cost by a percentage exceeding a second standard value; and
execute the switch control with priority over the cost-saving control.

14. The air conditioning system according to claim 13, wherein
the controller is further configured to prevent at least one of
execution of the switch control until a fourth time period elapses,
execution of the cost-saving control from startup until the fourth time period elapses, and
execution of the switch control or the cost-saving control until a fifth time period elapses.

15. The air conditioning system according to claim 1, wherein
the controller is further configured to prevent at least one of
execution of the switch control from startup until a fourth time period elapses, and
execution of the switch control until a fifth time period elapses.

* * * * *